US007669275B2

(12) United States Patent
Yagi

(10) Patent No.: US 7,669,275 B2
(45) Date of Patent: Mar. 2, 2010

(54) CLUTCH DEVICE AND MOTOR APPARATUS HAVING THE SAME

(75) Inventor: Hideyuki Yagi, Toyohashi (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 1149 days.

(21) Appl. No.: 11/268,611

(22) Filed: Nov. 8, 2005

(65) Prior Publication Data

US 2006/0101603 A1    May 18, 2006

(30) Foreign Application Priority Data

Nov. 16, 2004  (JP)  ............... 2004-331682
Apr. 28, 2005  (JP)  ............... 2005-133372
Apr. 28, 2005  (JP)  ............... 2005-133373

(51) Int. Cl.
  *B60S 1/18* (2006.01)
  *B60S 1/24* (2006.01)
  *B60S 1/26* (2006.01)

(52) U.S. Cl. .............. 15/250.31; 15/250.3; 74/425; 464/39

(58) Field of Classification Search ............... 15/250.3, 15/250.31, 250.12; 74/425; 192/138, 148
See application file for complete search history.

(56) References Cited

U.S. PATENT DOCUMENTS

| | | | |
|---|---|---|---|
| 2,561,136 A | | 7/1951 | Richardson |
| 3,777,591 A | * | 12/1973 | Thomasian ............... 74/576 |
| 3,927,436 A | * | 12/1975 | Inoue et al. ............. 15/250.17 |
| 3,934,688 A | | 1/1976 | Sides et al. |
| 5,690,577 A | | 11/1997 | Enzmann |
| 5,848,553 A | * | 12/1998 | Miyazaki ............... 74/42 |
| 5,855,140 A | * | 1/1999 | Imamura ............... 74/42 |
| 5,907,885 A | * | 6/1999 | Tilli et al. ............. 15/250.16 |

(Continued)

FOREIGN PATENT DOCUMENTS

DE    2433995    2/1975

(Continued)

OTHER PUBLICATIONS

Office Action dated Jan. 20, 2009, in corresponding Japanese patent application No. 2005-133373 (and English Translation).

(Continued)

*Primary Examiner*—Lee D Wilson
(74) *Attorney, Agent, or Firm*—Posz Law Group, PLC

(57) ABSTRACT

In a clutch device, an output shaft supports an input disk rotatably about an axis thereof, and a clutch disk non-rotatably about the axis and movably in an axial direction of the output shaft. An elastic member exerts resistive force on the input disk or the clutch disk when the clutch disk is about to come out of an engagement with the input disk. One of the input disk and the clutch disk has a trailing surface inclined by a predetermined angle from the axis, and the other has a curved control surface to come in a line contact with the trailing surface in a circumferential direction of the output shaft. The trailing surface and the curved control surface generate a component force of a driving force in the axial direction. The other having the curved control surface is higher in hardness than the one having the trailing surface.

13 Claims, 18 Drawing Sheets

U.S. PATENT DOCUMENTS

| | | | |
|---|---|---|---|
| 6,026,536 A * | 2/2000 | Miller et al. | 15/250.31 |
| 6,058,553 A | 5/2000 | Tsuyama et al. | |
| 6,116,110 A * | 9/2000 | Maue et al. | 74/471 R |
| 2005/0097698 A1* | 5/2005 | Yagi et al. | 15/250.3 |
| 2005/0097699 A1* | 5/2005 | Yagi et al. | 15/250.3 |
| 2006/0117514 A1* | 6/2006 | Yagi et al. | 15/250.3 |

FOREIGN PATENT DOCUMENTS

| | | |
|---|---|---|
| DE | 4007483 | 9/1990 |
| JP | Y2-2505881 | 8/1996 |
| JP | 09118202 | 5/1997 |
| JP | A-9-166155 | 6/1997 |
| WO | WO 99/19184 | 4/1999 |

OTHER PUBLICATIONS

Search Report from European Patent Office issued on Apr. 26, 2007 for a counterpart European application No. 05024564.6.
Office Action dated Jul. 4, 2008, in corresponding Chinese patent application No. 200510125398.2 (and English Translation).
Office Action dated Sep. 9, 2008, in corresponding European patent application No. 05 024 564.6-1252 (and English Translation).

* cited by examiner

CLUTCH DEVICE AND MOTOR APPARATUS HAVING THE SAME

CROSS REFERENCE TO RELATED APPLICATION

This application is based upon and claims the benefit of priority of Japanese Patent Applications No. 2004-331682 filed on Nov. 16, 2004, No. 2005-133372 filed on Apr. 28, 2005 and No. 2005-133373 filed on Apr. 28, 2005, the contents of which are incorporated herein by reference.

FIELD OF THE INVENTION

The present invention relates to a clutch device and a motor apparatus such as a wiper motor provided with the clutch device.

BACKGROUND OF THE INVENTION

Various wiper motors applied to a wiper apparatus to wipe a window glass of a vehicle are known. One of such wiper motors has a swing mechanism built therein, so that an output shaft of the wiper motor swings a wiper arm coupled with a wiper blade to reciprocatingly wipe a surface to be wiped.

In this kind of wiper motor, when an operation of a wiper arm is hindered to exert excessively large load on the output shaft of the wiper motor, the swing mechanism or a deceleration mechanism built therein can be damaged. Thus, the action of such excessively large load must be taken into account in designing the strength of each member constituting these mechanisms.

To avoid this issue, some wiper motor having the swing mechanism is provided with a clutch device in the output shaft thereof. Thus, each member constituting the above-mentioned mechanisms does not require too high strength on the assumption of the action of excessively large load, and the wiper motor is small, lightweight, and inexpensive.

The above-mentioned clutch device has an input disk and a clutch disk to transmit rotational driving force therebetween. The clutch device has a construction to transmit the rotational driving force about an axis of an output shaft by engaging these disks with each other in an axial direction of the output shaft. When overload exceeding a predetermined value acts on the output shaft, the rotational driving force inputted into the input shaft exerts a component force in the axial direction of the output shaft against urging force of an urging member, which is to maintain an engagement between the input disk and the clutch disk. Thus, engaging projected portions from engaging recessed portions are disengaged from each other to idly rotate them relative to each other, to prevent the respective members from being damaged.

The engaging projected portions and the engaging recessed portions of the input disk and the clutch disk exert a component force upward in the axial direction by simple engagement (refer to JP-2505881-Y2), specifically by a torque transmission surface in the rotational direction, that is, by slopes of the engaging surfaces (ascending slopes relative to the direction of action of torque) when the overload acts. The engaging surfaces are in surface contact with each other, to secure the transmission of the rotational driving force.

However, when the input disk and the clutch disk relatively moves in the direction of disengagement against the urging force of the urging member under the action of the overload as described above, the urging force (pressing force) of the urging member gradually increases as the relative displacement stroke of the input disk and the clutch disk increases until they are completely disengaged from each other. Accordingly, operation torque also gradually increases during a period from a start of the overload action to a complete disengagement.

When the engaging surfaces of the engaging projected portions and the engaging surfaces of the engaging recessed portions are brought into surface contact with each other, the frictional force between them is prone to vary. In conjunction with increase in urging force (pressing force) of the urging member, this variation becomes more noticeable, and operation torque becomes unstable.

Thus, magnitude and direction of the above-mentioned component force vary much when repeated engagements and disengagements wear the engaging projected portions and/or the engaging recessed portions. Accordingly, the input disk and the clutch disk cannot be disengaged from each other with high accuracy under the overload exceeding the predetermined value.

SUMMARY OF THE INVENTION

The present invention is achieved to solve the above-described issues, and has an object to provide a clutch device and a motor apparatus having the clutch device that stabilizes disengagement load of the clutch disk from the input disk (operation torque), that is, the clutch device that decreases a variation of the disengagement load from a set value, to decrease wear, and to enhance durability.

The clutch device has an output shaft, an input disk, a clutch disk and an elastic member. The output shaft is rotatably supported in a housing. The input disk is supported on the output shaft rotatably about an axis of the output shaft to be rotated by an input of a rotational driving force. The clutch disk is supported on the output shaft non-rotatably about the axis and movably in an axial direction of the output shaft to face the input disk in the axial direction to come into an engagement with the input disk in the axial direction. The elastic member exerts resistive force on at least one of the input disk and the clutch disk when the clutch disk is about to come out of the engagement with the input disk. One of the input disk and the clutch disk has a trailing surface inclined by a predetermined angle from the axis, and the other of the input disk and the clutch disk has a curved control surface to face the trailing surface in a circumferential direction of the output shaft to come in a line contact with the trailing surface, the trailing surface and the curved control surface generating a component force of the rotational driving force in the axial direction. The other of the input disk and the clutch disk having the curved control surface is higher in hardness than the one having the trailing surface.

BRIEF DESCRIPTION OF THE DRAWINGS

Other objects, features and advantages of the present invention will be appreciated, as well as methods of operation and the function of the related parts, from a study of the following detailed description, the appended claims, and the drawings, all of which form a part of this application. In the drawings:

DESCRIPTION OF THE PREFERRED EMBODIMENTS

Figure 1:
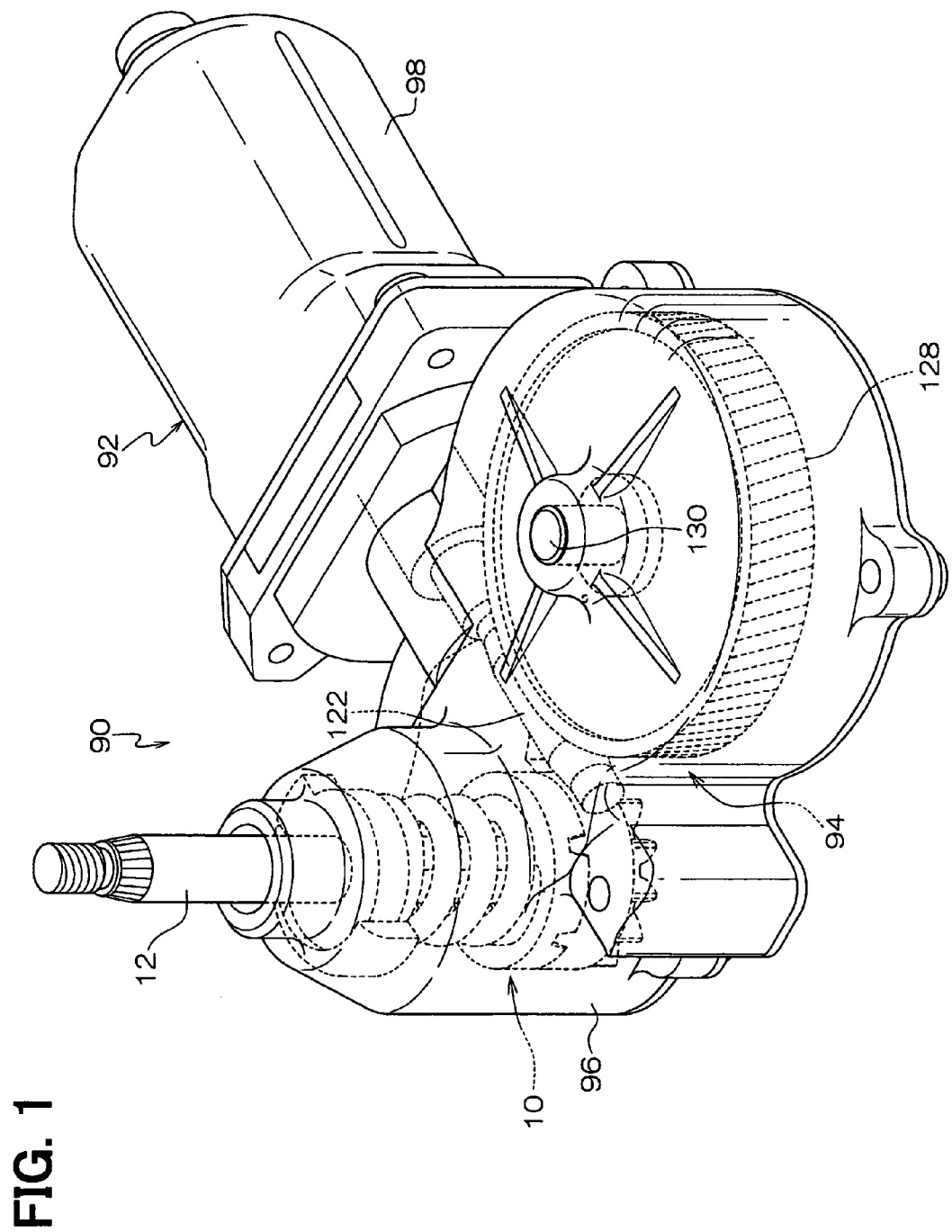
FIG. 1 is a perspective view showing a construction of a motor apparatus according to an embodiment of the present invention.
Figure 2:
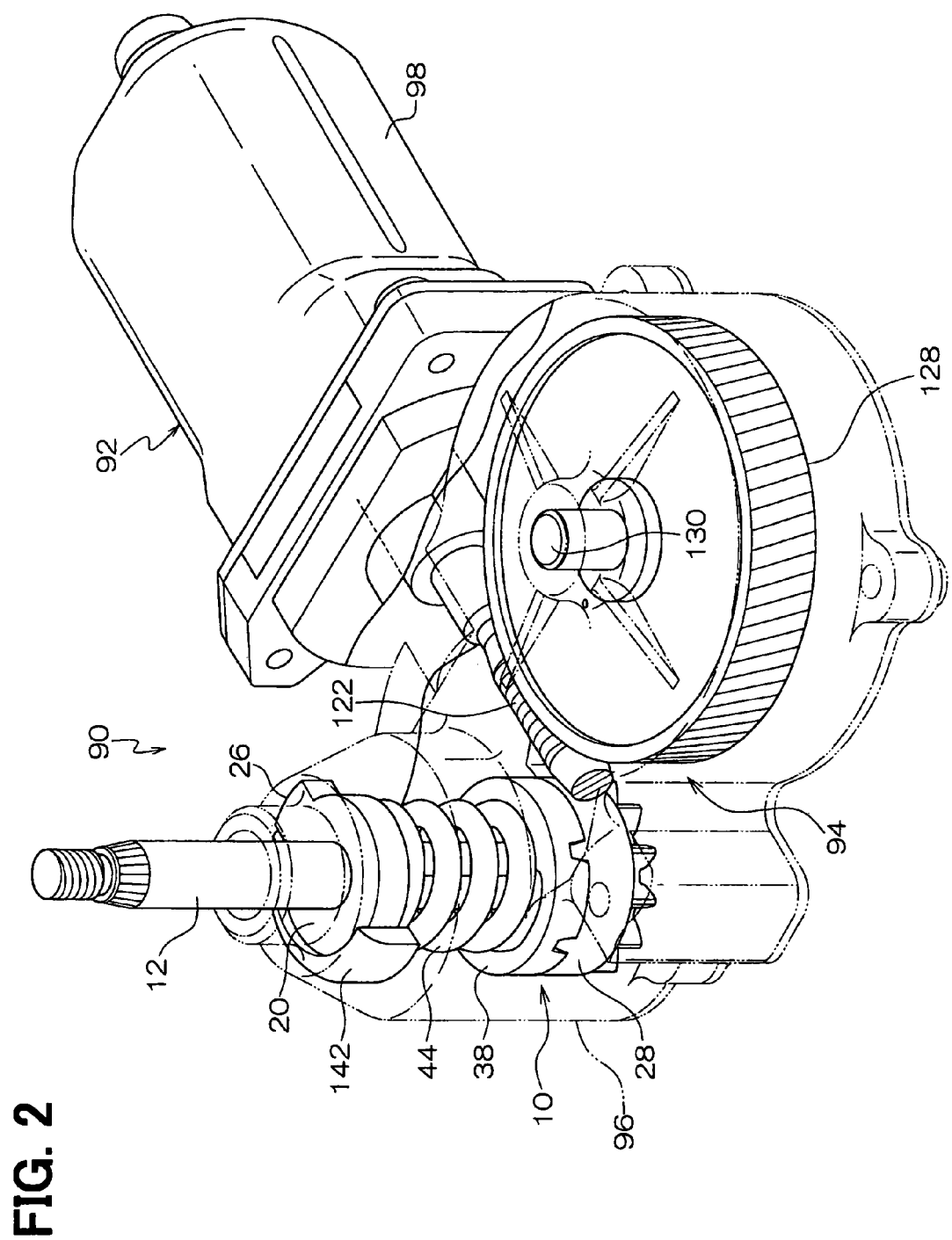
FIG. 2 is a partially see through perspective view showing the construction of the motor apparatus according to the embodiment of the present invention.
Figure 3:
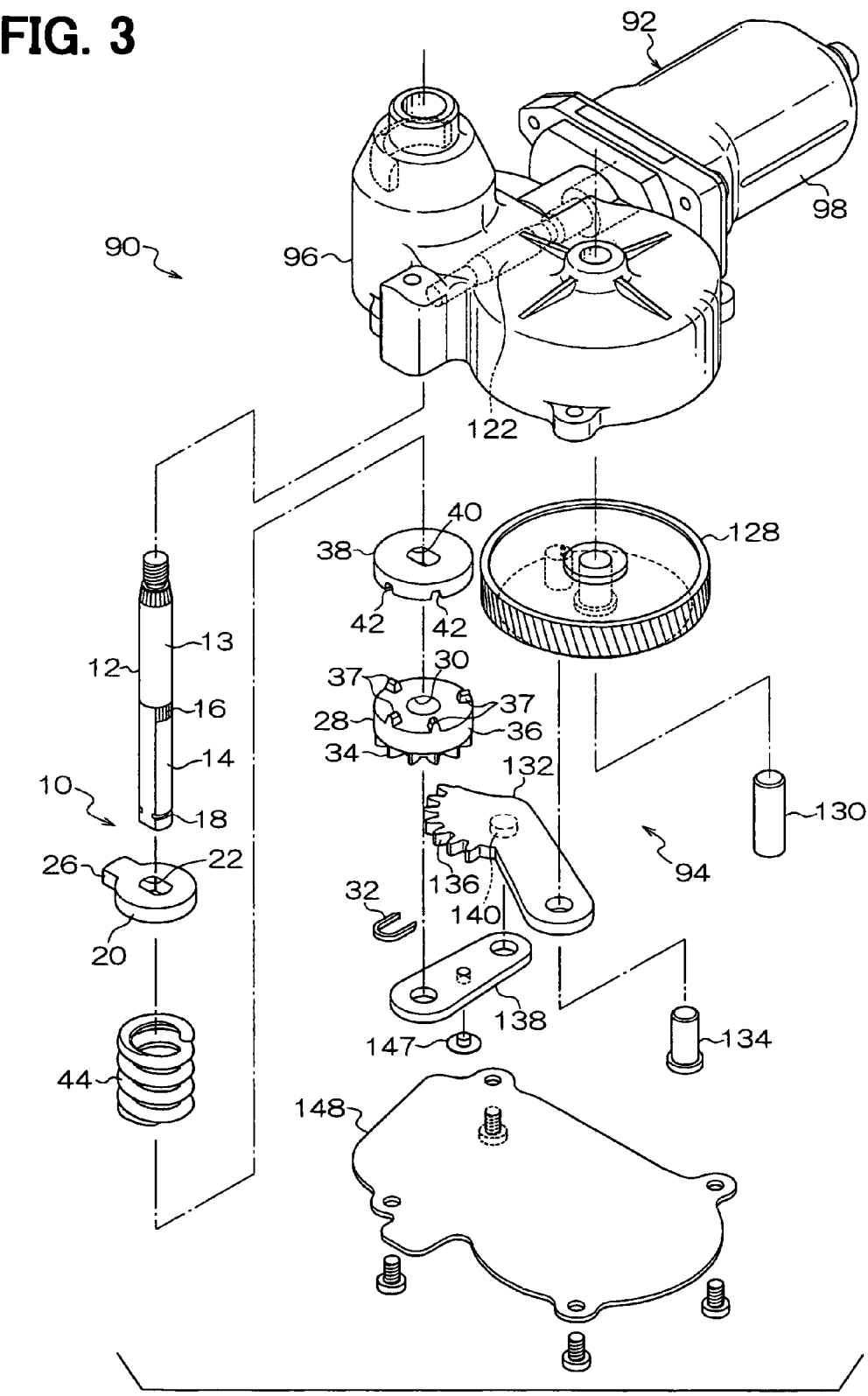
FIG. 3 is an exploded perspective view showing the construction of the motor apparatus according to the embodiment of the present invention.
Figure 17:
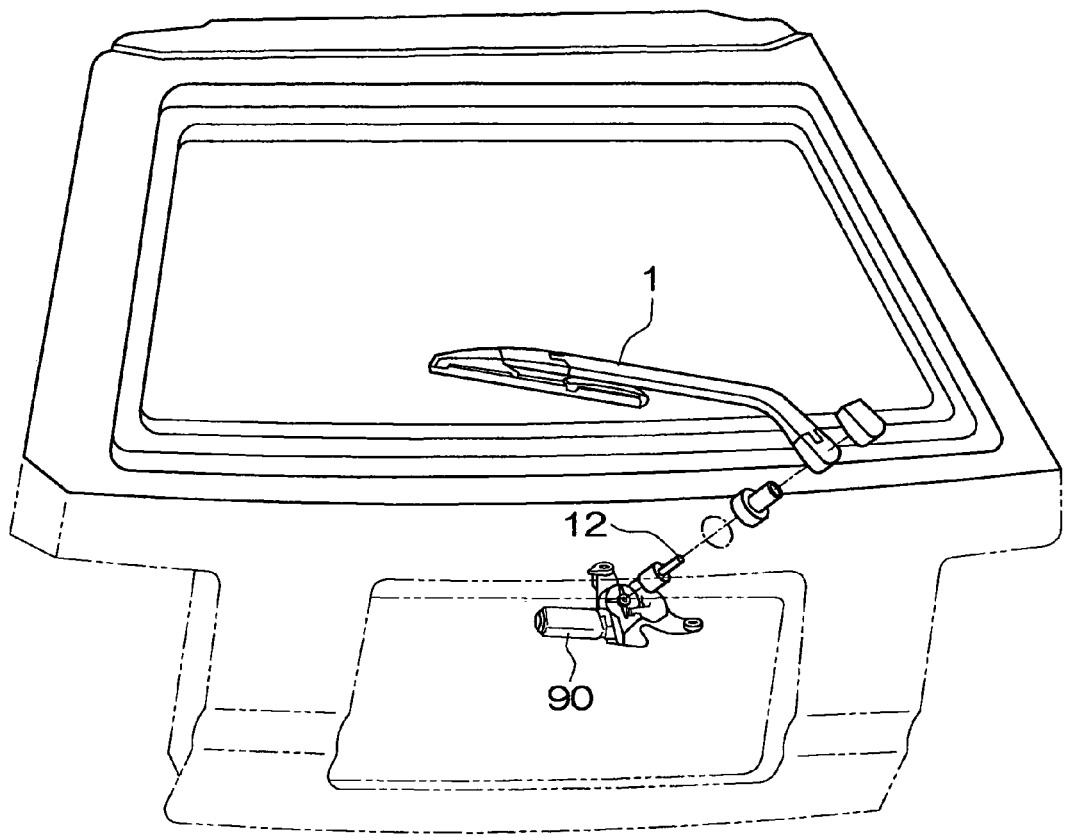
FIG. 17 is a perspective view showing an installation state of the motor apparatus on a vehicle according to the embodiment of the present invention.

In the following is described a wiper motor (a motor apparatus) according to an embodiment of the present invention. As shown in FIG. 17, the wiper motor 90 is configured as a wiper driving motor for driving a wiper apparatus 1 of a vehicle. FIGS. 1 and 2 depict an entire construction of the wiper motor 90 according to the embodiment of the present invention. FIG. 3 is an exploded perspective view showing the construction of the wiper motor 90 in detail. FIGS. 4 to 8 are sectional views showing the construction of the wiper motor 90. The wiper motor is provided with a motor body 92, a swing mechanism 94 and a clutch device 10.

Figure 4:
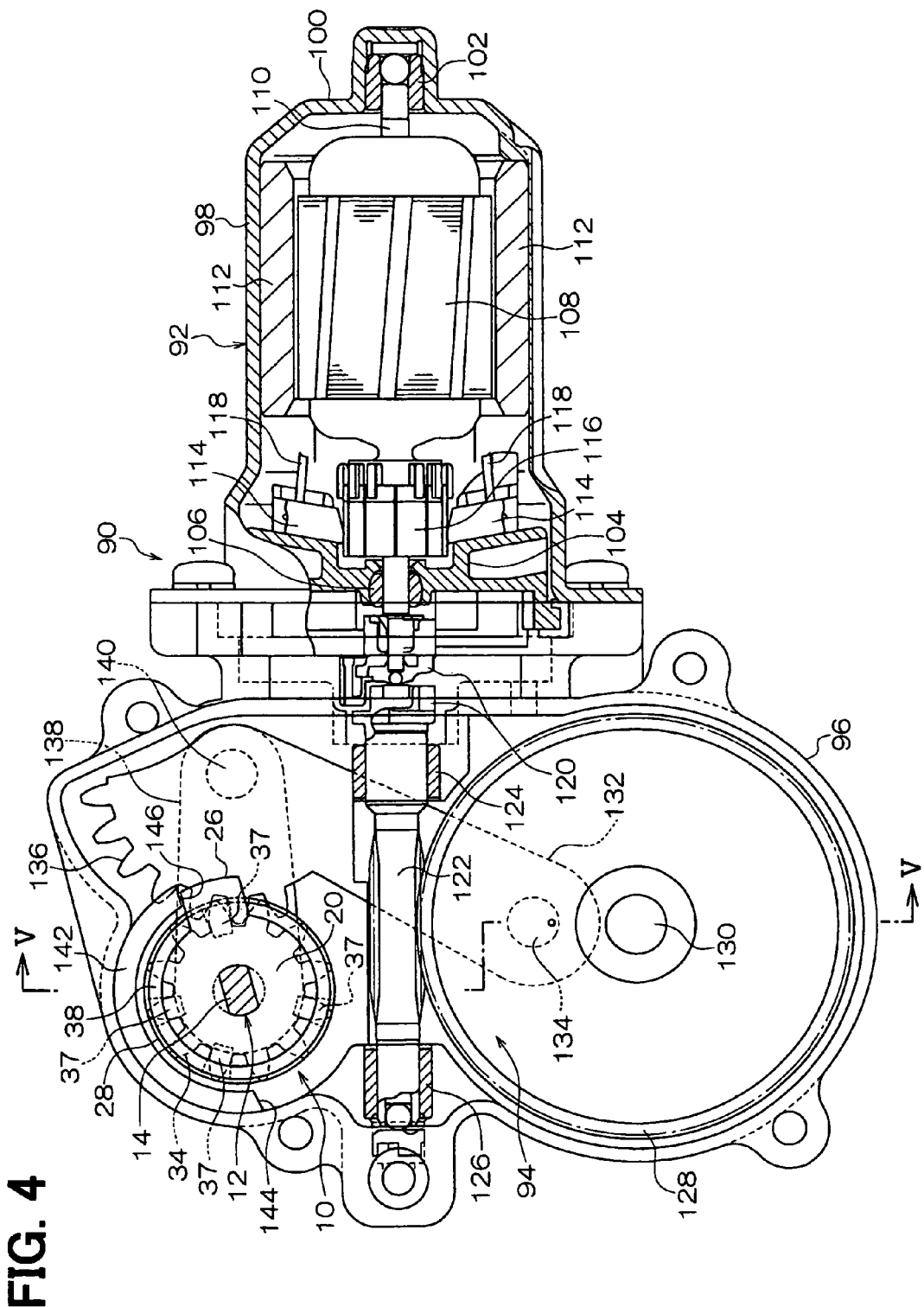
FIG. 4 is a plan cross-sectional view showing the construction of the motor apparatus according to the embodiment of the present invention.
Figure 6:
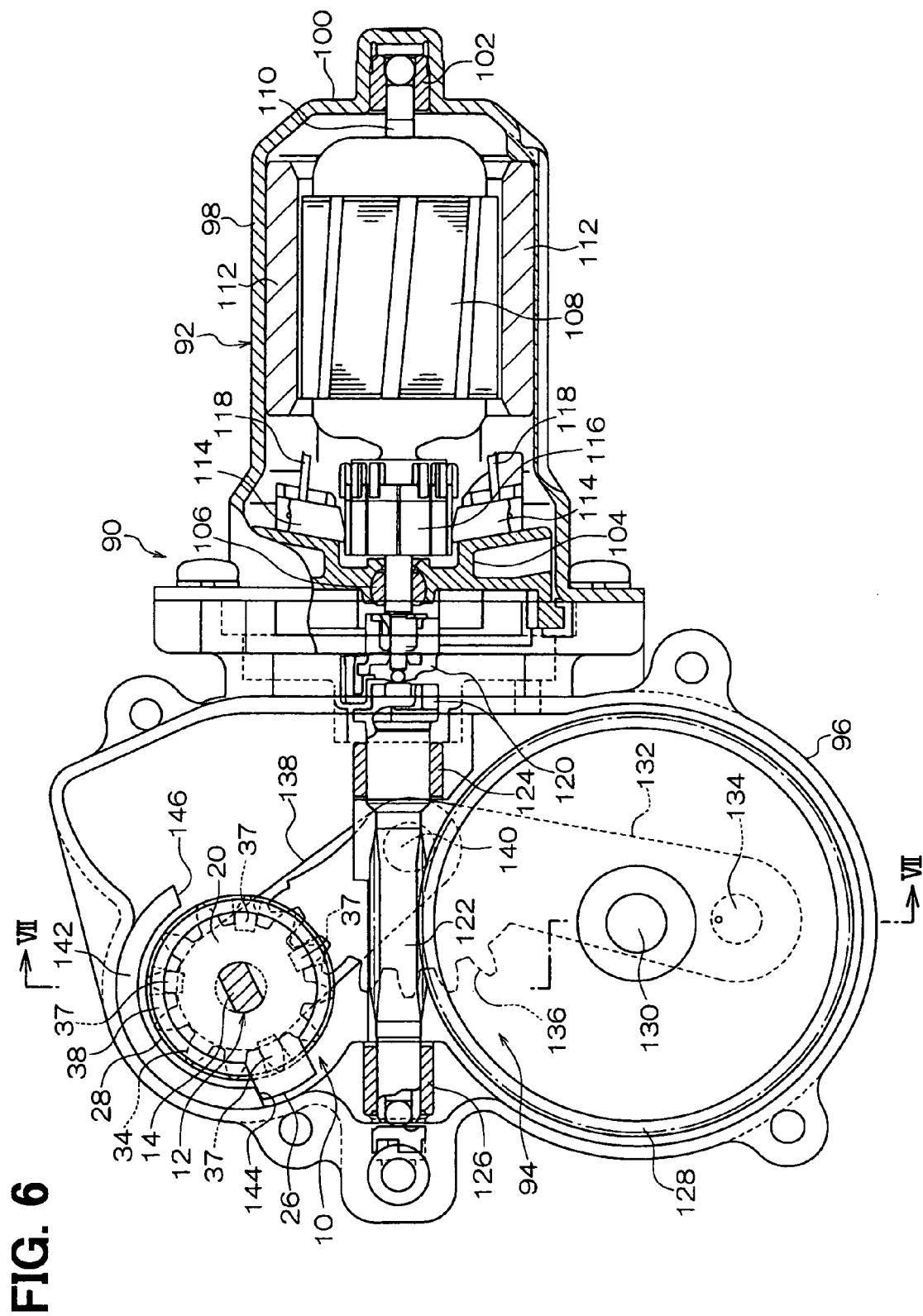
FIG. 6 is another plan cross-sectional view showing the construction of the motor apparatus according to the embodiment of the present invention.

As shown in FIGS. 4 and 6, the motor body 92 is provided with a yoke housing 98. The yoke housing 98 has a flat cylindrical shape. One axial end of the yoke housing 98 is drawn and closed. As shown in FIGS. 1 and 2, the yoke housing 98 is flat in a direction orthogonal to a rotating shaft 110 to make a thickness of the yoke housing 98 relatively small in an axial direction of an output shaft 12. The other axial end of the yoke housing 98 is opened and integrally fixed on a housing 96. A bearing 102 is disposed on the bottom wall 100 of the yoke housing 98. An end housing 104 made of insulating resin is fixed on the other end portion of the yoke housing 98.

A bearing 106 is disposed at a radial center of the end housing 104. The bearing 106 in the end housing 104 and the bearing 102 in the yoke housing 98 support the rotating shaft 110 of an armature 108, to house the armature 108 in the yoke housing 98. Magnets 112 are fixed on an inner circumferential wall of the yoke housing 98 to face the armature 108.

The end housing 104 holds brushes 114 via a brush case. The brush 114 has a prismatic shape, and is in pressure contact with a commutator 116 of the armature 108. Pigtails 118 for connection are led out from the brushes 114, and leading end portions of the pigtails 118 are connected with connecting wires for power supply.

A coupler 120 couples the rotating shaft 110 of the motor body 92 (of the armature 108) with a worm gear 122 of the swing mechanism 94. One bearing 124 in the housing 96 rotatably supports one axial end of the worm gear 122. Another bearing 126 in the housing 96 rotatably supports the other axial end of the worm gear 122. The worm gear 122 is engaged with a worm wheel 128.

The worm wheel 128 is disposed on one radial side of the axis of the worm gear 122, and is housed in the housing 96 to be engaged with the worm gear 122. The worm wheel 128 rotates about a wheel shaft 130 that is perpendicular to the axis of the worm gear 122 (the rotating shaft 110).

The worm wheel 128 is coupled with a sector gear 132 that serves as a swing member. One end of the sector gear 132 is rotatably coupled with the worm wheel 128 by a spindle (crank pin) 134, which is provided on the worm wheel 128 at a position different from that of the wheel shaft 130 (at a position radially displaced from that of the wheel shaft 130). A cog portion 136 is formed as an engaging portion at the other end of the sector gear 132. The cog portion 136 is associated (engaged) with an input disk 28 of an after-mentioned clutch device 10.

A holding lever 138 is disposed on one side (on an opposite side from the worm wheel 128) of the sector gear 132 in its thickness direction. One end of the holding lever 138 is coupled with a swing center shaft 140 (a spindle provided at a center of a pitch circle of the cog portion 136) in the cog portion 136 of the sector gear 132. The other end of the holding lever 138 is rotatably coupled with an output shaft 12, which is rotatably supported by the housing 96. Accordingly, a distance (pitch) between the swing center shaft 140 and the output shaft 12 is maintained to keep an engagement between the sector gear 132 and the input disk 28 along a radial direction of the output shaft 12. Thus, when the worm wheel 128 rotates, a reciprocative swing motion of the sector gear 132 reciprocatingly and rotationally drives the after-mentioned input disk 28.

A sliding member 147 made of resinous material or the like is fixed on the holding lever 138 on its side opposite from the sector gear 132. The sliding member 147 slidably abuts against a cover 148, which closes a rear side of the housing 96, to prevent the holding member 138 from moving in its thickness direction (in the axial direction of the output shaft 12). The output shaft 12 is disposed on one side of the worm gear 122 opposite from the worm wheel 128. Accordingly, the sector gear 132, the one end of which is coupled with the worm wheel 128, is disposed across (positioned on the skew with respect to) the axis of the worm gear 122. The cog portion 136 located at the other end of the sector gear 132 is engaged with the input disk 28.

Figure 9:
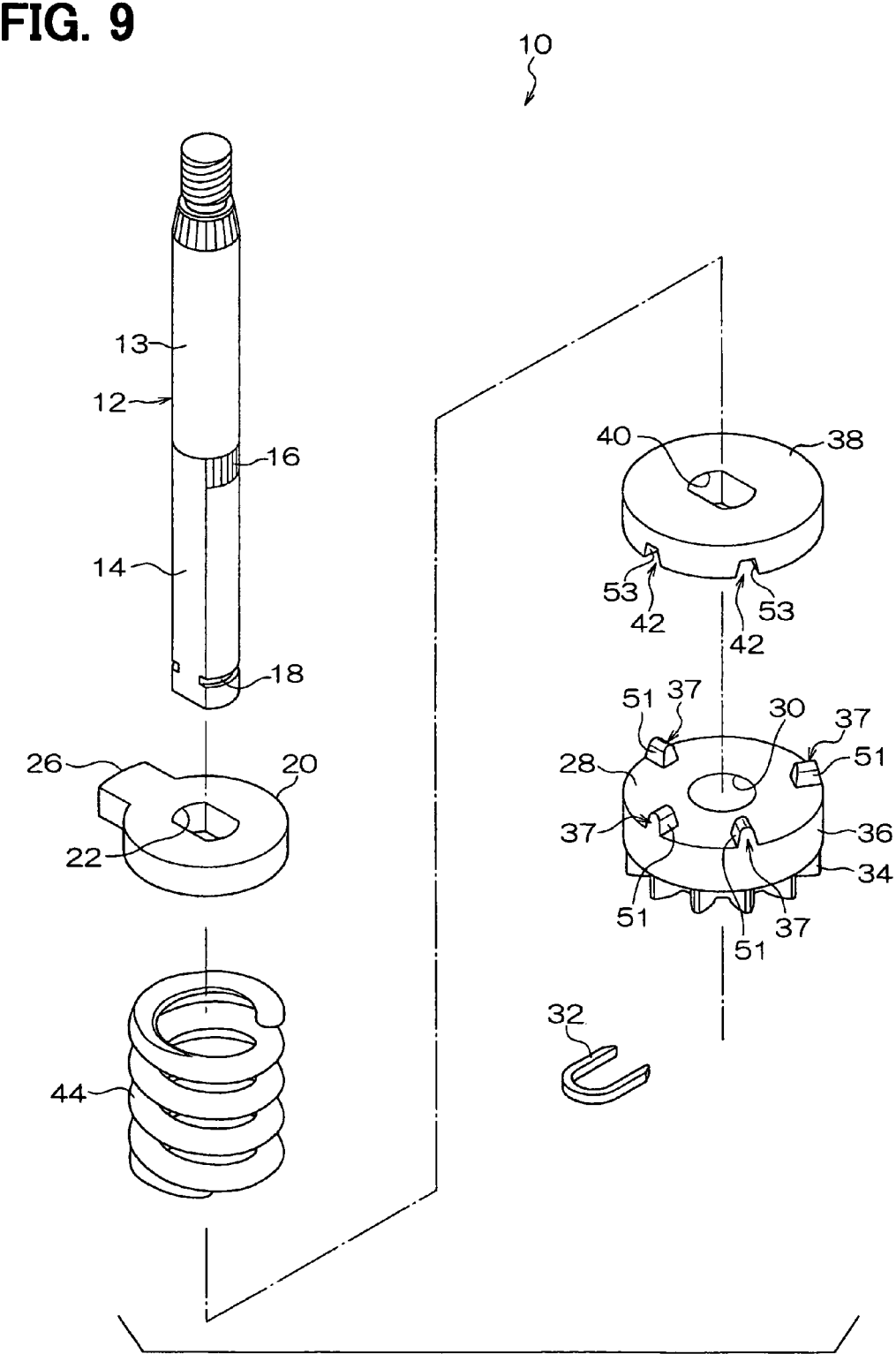
FIG. 9 is an exploded perspective view showing the construction of a clutch device, which is an element of the motor apparatus according to the embodiment of the present invention.
Figure 10:
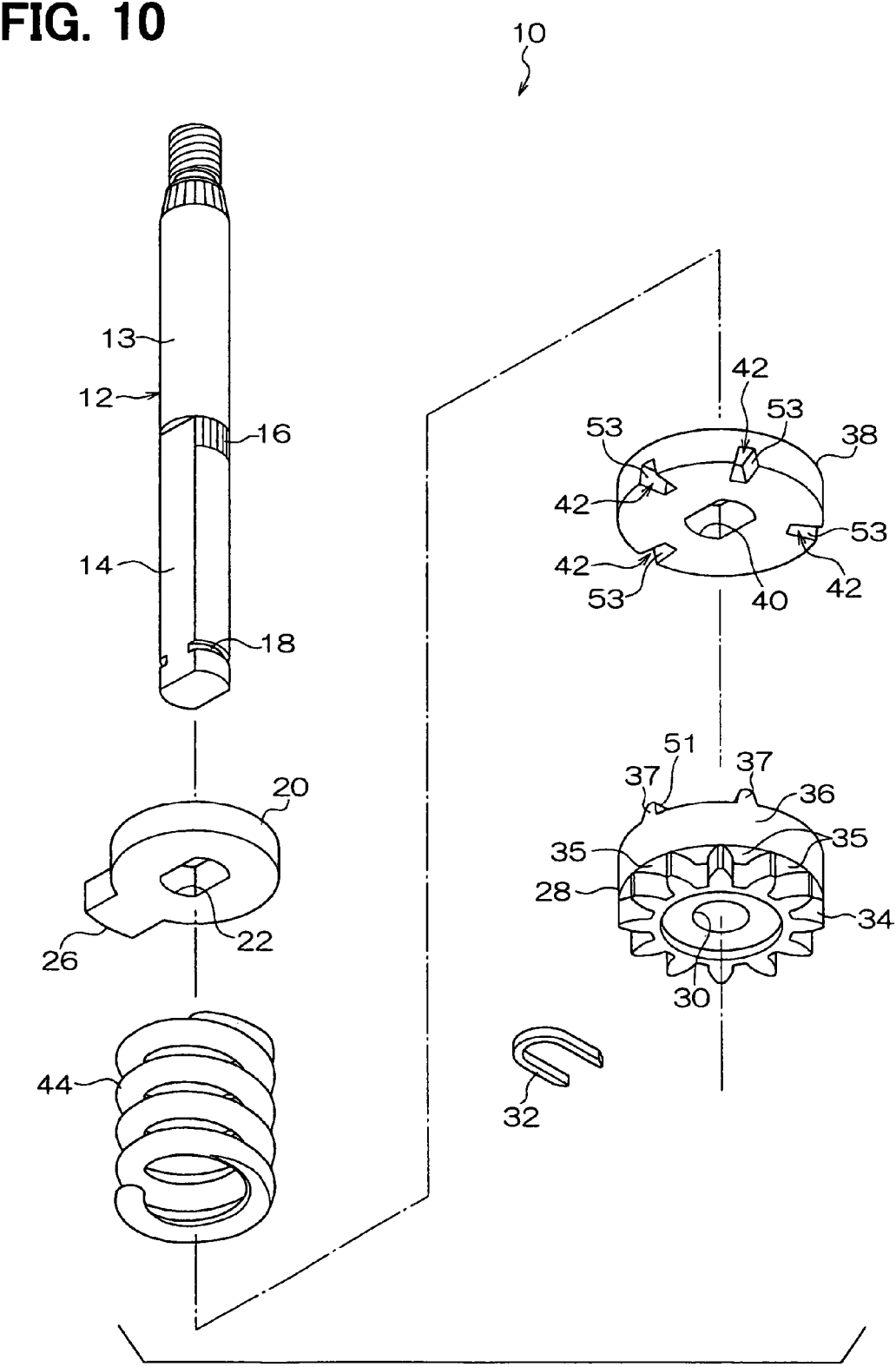
FIG. 10 is another exploded perspective view showing the construction of the clutch device, which is an element of the motor apparatus according to the embodiment of the present invention.

As shown in FIGS. 9 and 10, a leading end portion (an upper portion in FIGS. 9 and 10) of the output shaft 12 has a circular cross-section to serve as a columnar portion 13. A base end portion (a lower portion in FIGS. 9 and 10) of the output shaft 12 has an approximately rectangular cross-section (a "double-D cross-sectional profile" having a pair of flat surfaces formed on opposite sides to each other by 180 degrees in its circumferential direction and a pair of curved surfaces in connections to the flat faces) to serve as a relative rotation restriction portion 14.

Figure 5:
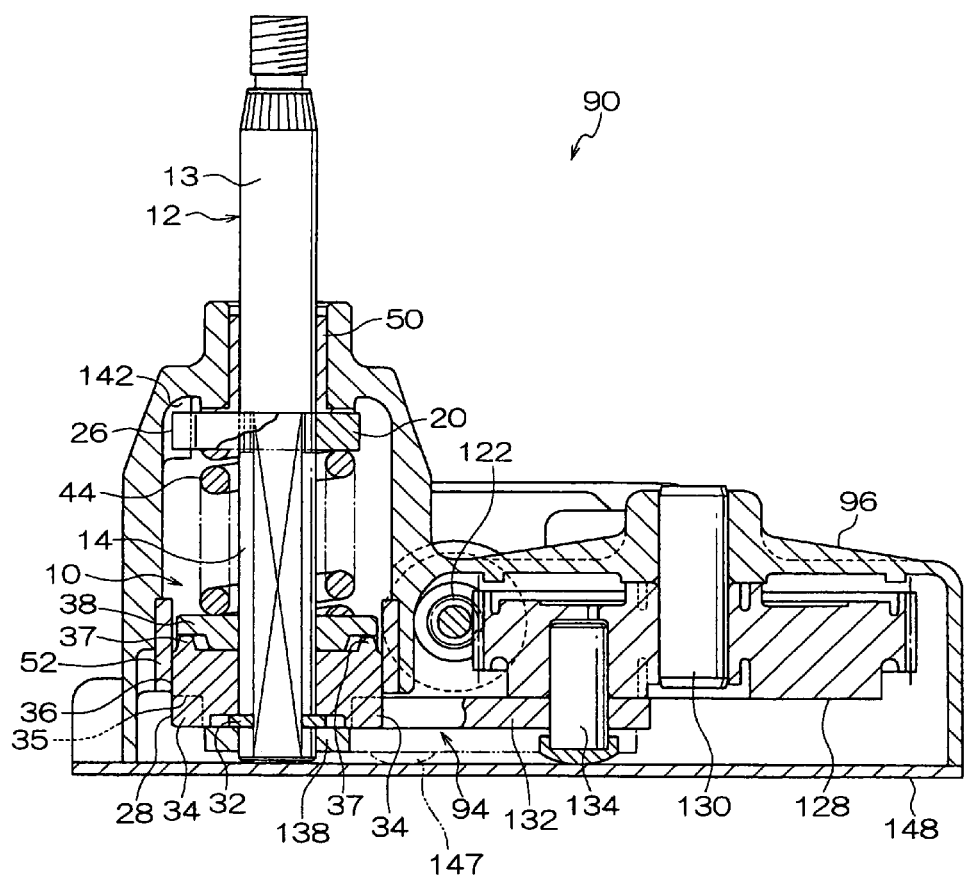
FIG. 5 is a cross-sectional view showing the construction of the motor apparatus according to the embodiment of the present invention taken along the line V-V in FIG. 4.
Figure 7:
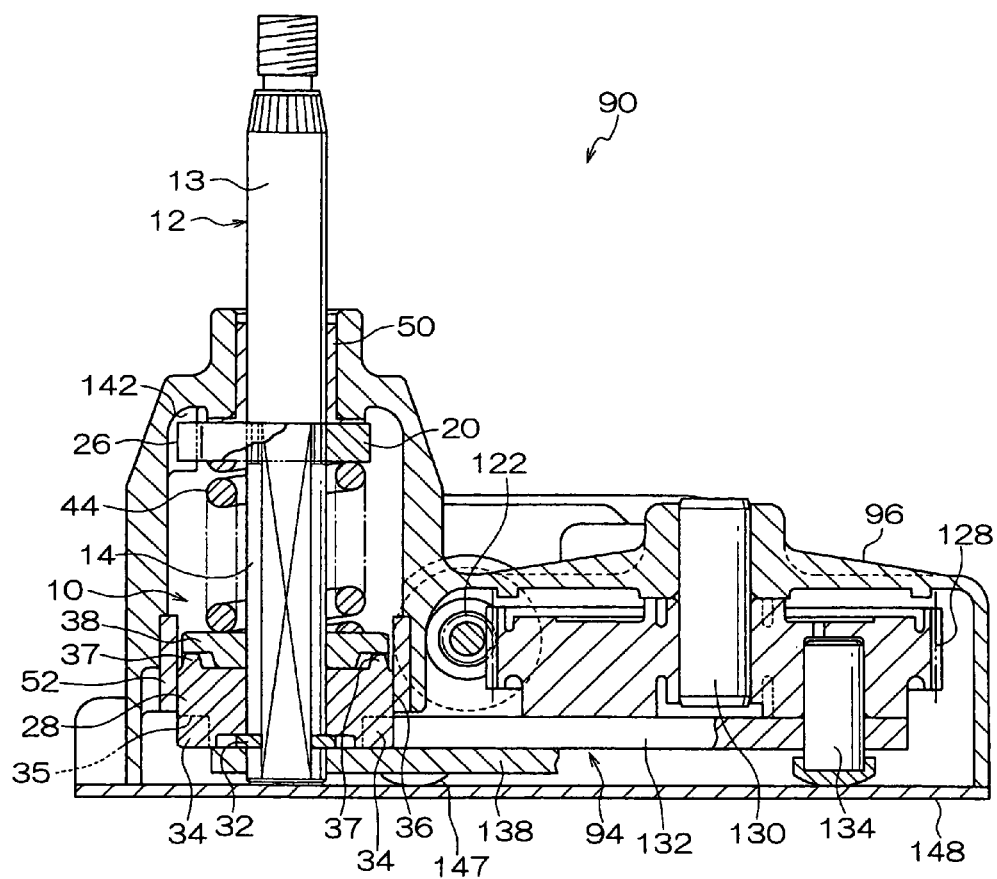
FIG. 7 is another cross-sectional view showing the construction of the motor apparatus according to the embodiment of the present invention taken along the line VII-VII in FIG. 6.

As shown in FIGS. 5 and 7, a bearing member 50 fixed in the housing 96 rotatably supports the columnar portion 13 of the output shaft 12. Each the curved surfaces of the relative rotation restriction portion 14 is provided at the leading end side portion thereof (at the columnar portion 13 side) with a turn-stop portion 16 in which a plurality of ridges are formed in its axial direction. A drop-prevention portion 18 is provided at a tip of the base end portion.

An engaging base 20 is fixed on the turn-stop portion 16 of the relative rotation restriction portion 14 to be coaxial with the output shaft 12, to serve as a large diameter portion in which a diameter of the output shaft 12 radially extends. The engaging base 20 has a disk shape having a support hole 22 formed at the center thereof. The support hole has a substantially rectangular cross-section corresponding to the relative rotation restriction portion 14 of the output shaft 12 (double-D cross-sectional profile). The support hole 22 is fixed on the turn-stop portion 16, so that the engaging base 20 rotates integrally with the output shaft 12 at all times (the engaging base 20 is prevented from moving axially against the output shaft 12). The engaging base 20 is provided with a stopper portion 26 that radially protrudes (in the radial direction of the output shaft 12) on the periphery thereof. The stopper portion 26 corresponds to an after-mentioned stopper projection 142 formed on the housing 96.

The present invention is not limited to the above-described construction in which the output shaft 12 and the engaging base 20 are separately formed and fixed on each other. For example, the output shaft 12 and the engaging base 20 may be integrally formed by cold forging or the like (to form a large diameter flange portion integrally with the output shaft).

The above-described input disk 28 is fixed on the drop-prevention portion 18 of the relative rotation restriction portion 14 to be coaxial with the output shaft 12. The input disk 28 is cylindrically shaped and provided with a shaft hole 30 having a circular cross-section at its center portion. The drop-prevention portion 18 of the output shaft 12 is inserted into the shaft hole 30. A retaining clip 32, which is attached to the end of the drop-prevention portion 18, prevents the input disk 28 from coming off. Thus, the output shaft 12 rotatably supports the input disk 28 to be prevented from coming off the one side thereof in the axial direction (an opposite side from the engaging base 20). In the present embodiment, the input disk 28 is sintered metal formed by so-called "powder metallurgy process", in which powder alloy is put in a compacting die, compacted, then heated and sintered. The sintered metal is impregnated with lubricating oil.

One axial end portion of the input disk 28 (a side opposite from the engaging base 20) has gear cogs 34 on an outer circumference thereof. The gear cogs 34 are engaged with the cog portion 136 of the sector gear 132 of the above-described swing mechanism 94. The input disk 28 rotates about the output shaft 12 when a driving force is inputted thereinto from the sector gear 132.

Figure 11:
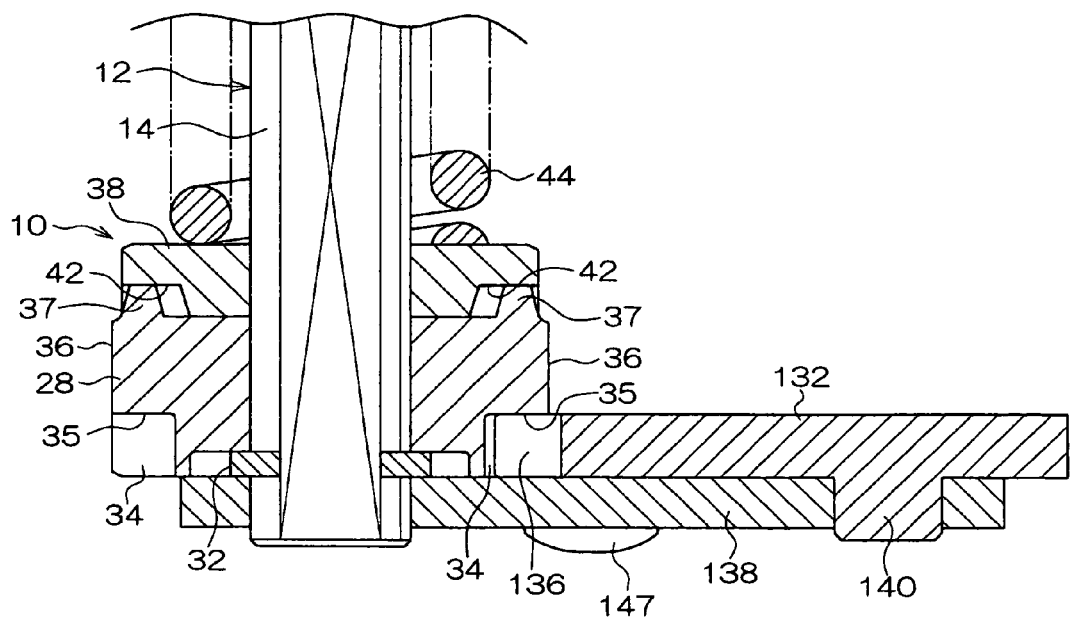
FIG. 11 is a cross-sectional view partially showing a construction of a swing mechanism and the clutch device, which are elements of the motor apparatus according to the embodiment of the present invention.

As shown in FIG. 10, the input disk 28 has a joint wall 35 at the other axial end side of the gear cogs 28 (at its engaging base 20 side, at its side opposite from the above-mentioned holding lever 138) to join end portions of the gear cogs 34. As shown in FIG. 11, the joint wall 35 and the holding lever 138 interpose the cog portion 136 of the sector gear 132 in its thickness direction (the joining wall 35 faces one end face of the cog portion 136 in the thickness direction, and the holding lever 138 faces the other end face of the cog portion 136 in the thickness direction, to prevent the cog portion 136 of the sector gear 132 from moving in the thickness direction).

A circumference of the input disk 28 at its side opposite from the gear cogs 34 with respect to the joining wall 35 is a circumferential surface 36 that is coaxial with the output shaft 12. As shown in FIGS. 5 and 7, the circumferential surface 36 is rotatably held (supported) by a bearing member 52 fixed on the housing 96. That is, the input disk 28 has a disc-shaped flange portion on the other axial end side thereof to be coaxial with the output shaft 12. An outer circumferential surface of the disc-shaped flange portion (the circumferential surface 36) is supported by the bearing member 52.

Four engaging projected portions 37 are formed at an outer circumferential portion on one end surface of the input disk 28 on the other end side in the axial direction (on the engaging base 20 side, on the leading end portion side of the output shaft 12 in the axial direction). The engaging projected portions 37 protrude toward the engaging base 20. The four engaging projected portions 37 are disposed coaxially to the input disk 28 and at irregular intervals in a circumferential direction of the input disk 28 (so that the intervals between the engaging projected portions 37 differ from one another in the circumferential direction). These engaging projected portions 37 correspond to engaging recessed portions 42 of an after-mentioned clutch disk 38.

The relative rotation restriction portion 14 of the output shaft 12 supports the clutch disk 38 coaxially to the output shaft 12 between the above-described engaging base 20 and the input disk 28. The clutch disk 38 is formed in a disk shape, and has a shaft hole 40 formed at the center thereof. The shaft hole 40 has a substantially rectangular cross-section (double-D cross-sectional profile) to correspond to the relative rotation restriction portion 14. The output shaft 12 (the relative rotation restriction portion 14) is inserted into the shaft hole 40 so that the clutch disk 38 is disposed on the other side (on an after-mentioned coil spring 44 side, on the engaging base side 20) relative to the input disk 28 in the axial direction of the output shaft 12, and supported on the output shaft 12 unrotatably about the axis thereof and movably in the axial direction thereof. Thus, the clutch disk 38 integrally rotates with the output shaft 12 at all times, and is relatively movable in the axial direction of the output shaft 12 with respect to the input disk 28. In the present embodiment, the clutch disk 38 is a sintered metal that is manufactured by the above-mentioned "powder metallurgy process" and impregnated with lubricating oil.

Four engaging recessed portions 42 are formed in a depressed manner (recessed manner) at an outer circumferential portion on a rear surface of the clutch disk 38 (on the input disk 28 side surface, on the base end portion side of the output shaft 12 in the axial direction). The engaging recessed portions 42 correspond to the above-mentioned four engaging projected portions 37 of the input disk 28. The engaging recessed portions 42 are disposed coaxially to the clutch disk 38 and at irregular intervals in a circumferential direction of the clutch disk 38 (so that the intervals between the engaging recessed portions 42 differ from one another in the circumferential direction).

The four engaging recessed portions 42 can respectively receive the four engaging projected portions 37 of the input disk 28 (that is, the clutch disk 38 can be engaged with the input disk 28). Thus, when the input disk 28 rotates in a normal use condition (in a rotational state), torque of the input disk 28 is transmitted to the clutch disk 38 to rotate the clutch disk 38 integrally.

As described above, the engaging projected portions 37 and the engaging recessed portions 42 are so provided that they are not disposed at regular intervals in the circumferential direction of the input disk 28 and the clutch disk 38, respectively (so provided that the intervals between the engaging projected portions 37 and the intervals between the engaging recessed portions 42 differ one another). Thus, the clutch disk 38 (the output shaft 12 and the wiper) and the input disk 28 are engaged with each other only when they are in a specific relative position in the circumferential direction. In other positions than the above specific relative position, even when one engaging projected portion 37 aligns with any one engaging recessed portion 42, the other three remaining engaging projected portions 37 do not align with the engaging recessed portions 42. Accordingly, when the engaging projected portions 37 are out of the engaging recessed portions 42, at least three engaging projected portions 37 of the clutch disk 38 are in contact with the input disk 28 (the clutch disk 38 is supported at three points).

Figure 12:
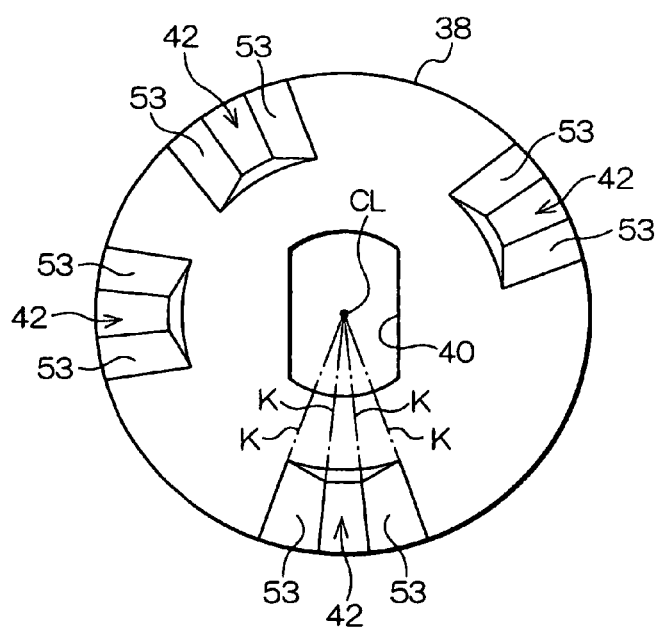
FIG. 12 is a rear view of a clutch disk showing shapes and an arrangement of engaging recessed portions provided on the clutch disk, which is an element of the motor apparatus according to the embodiment of the present invention.

As shown in FIG. 12, the engaging projected portions 37 of the input disk 28 and the engaging recessed portions 42 of the clutch disk 38 are formed in such shapes that their edges (side wall portions) in the circumferential direction matches with radial lines K intersecting with the axis CL of each member (the axis of the output shaft 12 (in such shapes that the edges in the circumferential direction are formed in identical shape (that is, in such shapes that they open radially outward in a fan-like fashion outward). Thus, in the contact portion between the engaging projected portions 37 and the engaging recessed portions 42, a surface pressure is uniform from a radially inner portion to a radially outer portion (the Hertz contact surfaces pressure due to sliding motion is reduced).

The engaging projected portions 37 of the input disk 28 and the engaging recessed portions 42 of the clutch disk 38 are so formed that their cross-sectional shapes are respectively substantially trapezoidal. In the present embodiment, each the engaging projected portions 37 of the input disk 28 has trailing surfaces 51 on the left and right sides of the trapezoidal cross-sectional shape. Each the engaging recessed portions 42 of the clutch disk 38 has curved control surfaces 53 on the left and right sides of the trapezoidal cross-sectional shape. That is, as shown in FIG. 13, each the trailing surfaces 51 of the engaging projected portions 37 is so formed that it is inclined by a specific angle θ (an operable angle required for so-called clutch operation torque: for example, 54.4 degrees in the present embodiment) with respect to an axis of the clutch disk 38 (the output shaft 12).

Figure 13:
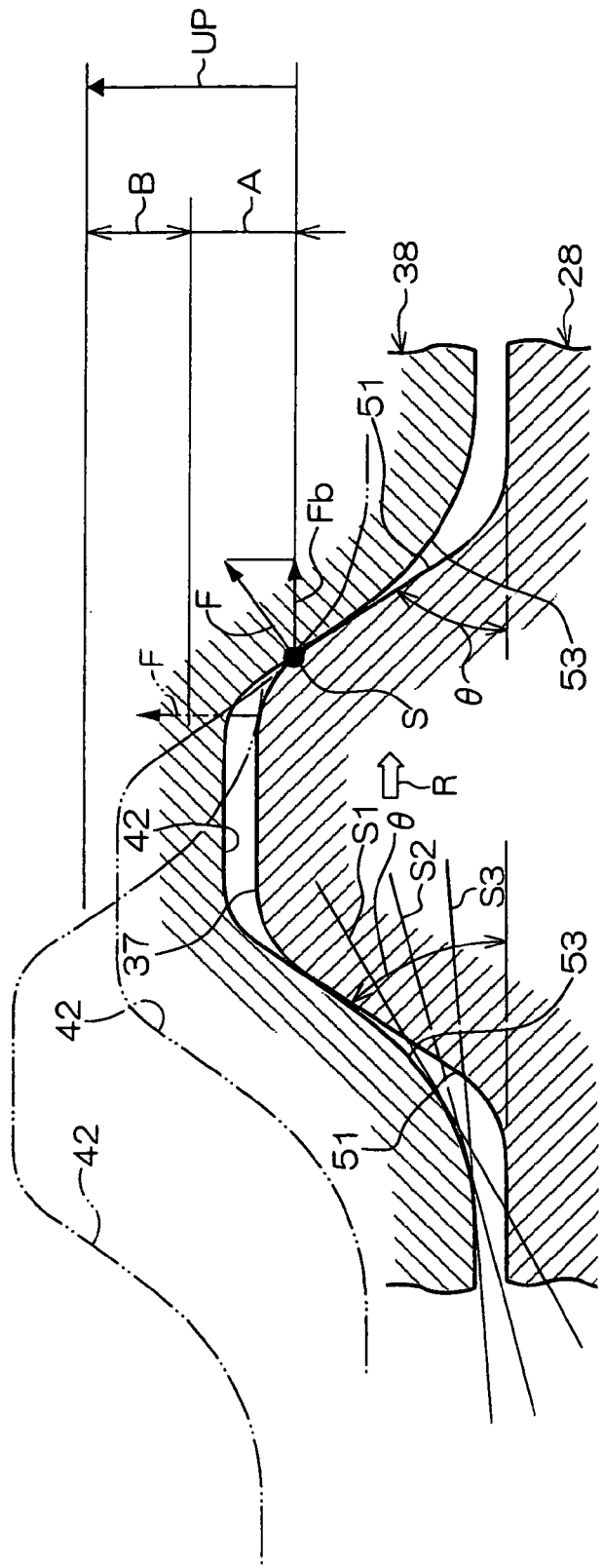
FIG. 13 is a cross-sectional view showing a construction of an engaging projected portion provided on an input disk of the clutch device and the engaging recessed portion provided on the clutch disk of the clutch device, which are elements of the motor apparatus according to the embodiment of the present invention.

FIG. 13 depicts a construction of the engaging projected portions 37 and the engaging recessed portions 42 in detail.

Each the curved control surfaces 53 of the engaging recessed portions 42 is so curvedly formed that it is mated with a trailing surface 51 of an engaging projected portion 37 in line contact in the circumferential direction of the input disk 28 (the output shaft 12) (in point contact at a contact point S in an axial sectional view shown in FIG. 13). That is, the curved control surface 53 is a curved surface whose curvature is gradually varied so that a component force (represented by an arrow Fb in FIG. 13) of a surface pressure (represented by a solid arrow F in FIG. 13) in a rotation transmission direction (represented by an arrow R in FIG. 13) at a contact position with the trailing surfaces 51 decreases as it moves in a direction of disengagement between the engaging projected portions 37 and the engaging recessed portions 42 (a direction represented by an arrow UP in FIG. 13). More specifically, as shown in FIG. 13, the curved control surface 53 is so shaped that an angle, which is formed by a tangential line (FIG. 13 shows three tangential lines S1 to S3 as an example) at the contact position with the trailing surface 51 and a plane perpendicular to the axis of the output shaft 12, gradually decreases as it moves in the direction of disengagement between the engaging projected portions 37 and the engaging recessed portions 42. That is, the curved control surfaces 53 is a curved surface whose curvature is gradually varied, and the curvature (degree of the gradual variation) thereof is so set that the operation torque hardly varies (that it, it remains in an approximately constant flat torque) even when a compression stroke of a coil spring 44, which is described in detail later, increases.

Accordingly, the present embodiment is so configured that rotational force, which rotates the input disk 28 and the clutch disk 38 relatively to each other, such as rotation transmitting force from the input disk 28 to the crutch disc 38 when the input disk 28 rotates in a condition that the output shaft 12 is locked, or rotation transmitting force from the clutch disc 38 to the input disk 28 when an external force rotates the output shaft 12 (the clutch disk 38), lets the trailing surfaces 51 and the curved control surfaces 53 provide with a component force of the above-mentioned rotational driving force in the above-mentioned axial direction. Then, moving force in the axial direction of the output shaft 12 (toward the engaging base 20, in a direction to compress the coil spring 44) is provided in the clutch disk 38.

The input disk 28 and the clutch disk 38 are so configured that one of them having the curved control surfaces 53 (specifically the clutch disk 38 provided with the engaging recessed portion 42) is larger in hardness than the other having the trailing surfaces 51 (specifically the input disk 28 having the engaging projected portions 37). Thus, wear in the one having the curved control surfaces 53 is smaller than wear in the other having the trailing surfaces 51 (wear develops slower in the one having the curved control surfaces 53 than in the other having the trailing surfaces 51). Accordingly, even when the curved control surfaces 53 of the engaging recessed portions 42 are worn as mentioned above, the shape of their curved surfaces is maintained. Specifically, the trailing surfaces 51 of the engaging projected portions 37 are kept inclined by the specific inclination angle θ (the inclination angle θ is prevented from being changed by the wear). Thus, the one having the curved control surfaces 53 is kept associated with the other having the trailing surfaces 51 to be in the above-mentioned line contact.

In this embodiment, for example, the hardness of the engaging projected portions 37 (input disk 28) having the trailing surfaces 51 is HMV607 (in Vickers hardness: actual measurement value with a micro-Vickers hardness meter); and the hardness of the engaging recessed portions 42 (the clutch disk 38) having the curved control surfaces 53 is HMV648 (in Vickers hardness: the actual measurement value with the micro-Vickers hardness meter). Thus, the hardness difference is set to a value of 5% to 10% of the higher hardness of the members.

The present invention is not limited to the above-described construction in which the engaging projected portions 37 of the input disk 28 are provided with the trailing surfaces 51, and the engaging recessed portions 42 of the clutch disk 38 are provided with the curved control surfaces 53. Alternatively, they may be conversely constructed in such a manner that the engaging projected portions 37 of the input disk 28 are provided with the curved control surfaces 53, and the engaging recessed portions 42 of the clutch disk 38 are provided with the trailing surfaces 51. In this case, as well, the one having the curved control surfaces 53 (that is, the input disk 28 provided with the engaging projected portions 37) is configured to be larger in hardness than the other having the trailing surfaces 51 (that is, the clutch disk 38 provided with the engaging projected portions 42).

Between the clutch disk 38 and the engaging base 20 is disposed the coil spring 44, which is wound around the output shaft 12 to be compressible in the axial direction of the output shaft 12 to serve as an elastic member. The coil spring 44 applies a specific resistive force (a restoring force generated by elastic deformation due to an axial movement of the clutch disk 38) against an axial movement of the clutch disk 38 from an engagement state of the engaging projected portions 37 of the input disk 28 and the engaging recessed portions 42 of the clutch disk 38 to the other side (the coil spring 44 side) in the axial direction of the output shaft 12.

In other words, the present embodiment is so configured that the engaging projected portions 37 of the input disk 28 is introduced into the engaging recessed portions 42 of the clutch disk 38, and the coil spring 44 maintains this fit state under normal use conditions. When the engaging projected portions 37 of the input disk 28 are about to come out of the engaging recessed portions 42 of the clutch disk 38, and the clutch disk 38 is about to move in the axial direction to compress the coil spring 44, urging force (restoring force) is exerted against this.

As described above, the engaging projected portions 37 of the input disk 28 are respectively engaged into the engaging recessed portions 42 of the clutch disk 38, so that torque is transmitted from the input disk 28 to the clutch disk 38. The urging force (restoring force) of the coil spring 44 generates specific frictional force between the engaging projected portions 37 of the input disk 28 and the rear face of the clutch disk 38, even when the engaging projected portions 37 of the input disk 28 are out of the engaging recessed portions 42 of the clutch disk 38 (even when the clutch disk 38 has moved toward the engaging base 20). The urging force, etc. are so configured as to rotate the input disk 28 and the clutch disk 38 integrally.

The present embodiment is so configured that a peak value of torque about the output shaft 12 is within a range of 7N·m to 20N·m during a period before the engaging projected portions 37 and the engaging recessed portions 42 are disengaged from each other as described above.

The present embodiment may be configured so that the coil spring 44 provides pushing force between the engaging base 20 and the clutch disk 38 under normal use conditions (in which the clutch disk 38 is not about to move toward the engaging base 20), or that the coil spring 44 exerts urging force (restoring force) only against an action that the clutch disk 38 moves from the engagement position toward the engaging base 20 (the engaging projected portions 37 are about to come out of the engaging recessed portions 42).

As shown in FIGS. 4 and 6, the housing 96 is provided with a stopper projection 142, which corresponds with the above-mentioned stopper portion 26 of the engaging base 20.

The stopper projection 142 has an arc shape, and is positioned in a rotational trajectory of the stopper portion 26. One and the other ends of the stopper projection 142 in its circumferential direction respectively serve as rotation restriction portions 144, 146. Specifically, the rotation restriction portions 144, 146 of the stopper projection 142 are configured to come in contact with the stopper portion 26 to prevent the engaging base 20 (output shaft 12) from rotating further in a state that the stopper portion 26 is in contact with any one of the rotation restriction portions 144, 146. Thus, rotational driving force of the input disk 28 rotates the engaging base 20 (output shaft 12) together with the clutch disk 38. Subsequently, the stopper portion 26, which has come in contact with the rotation restriction portions 144, 146 of the stopper projection 142, forcibly prevents the engaging base 20 (output shaft 12) from rotating further, to put the input disk 28 in a relative rotation (idle rotation) (refer to FIGS. 14 and 15).

The input disk 28 reciprocatingly and rotationally drives the output shaft 12. The output shaft 28 is coupled with a wiper (now shown) directly or indirectly via a link, a rod or the like. The wiper reciprocatingly swings in accordance with the reciprocating rotation of the output shaft 12.

In the following is described an action of the present embodiment.

The wiper motor 90 having the above-described construction acts as follows: when the motor body 92 (the armature 108) rotates, the worm gear 122 transmits torque of the motor body 92 to the worm wheel 128 to rotate the worm wheel 128 (to continuously rotate in one direction in the present embodiment). The rotation of the worm wheel 128 reciprocatingly swings the sector gear 132, which is coupled with the worm wheel 128. The reciprocating swing motion of the sector gear 132 rotates the input disk 28 reciprocatingly and rotationally (refer to FIGS. 4 to 7).

Figure 14:
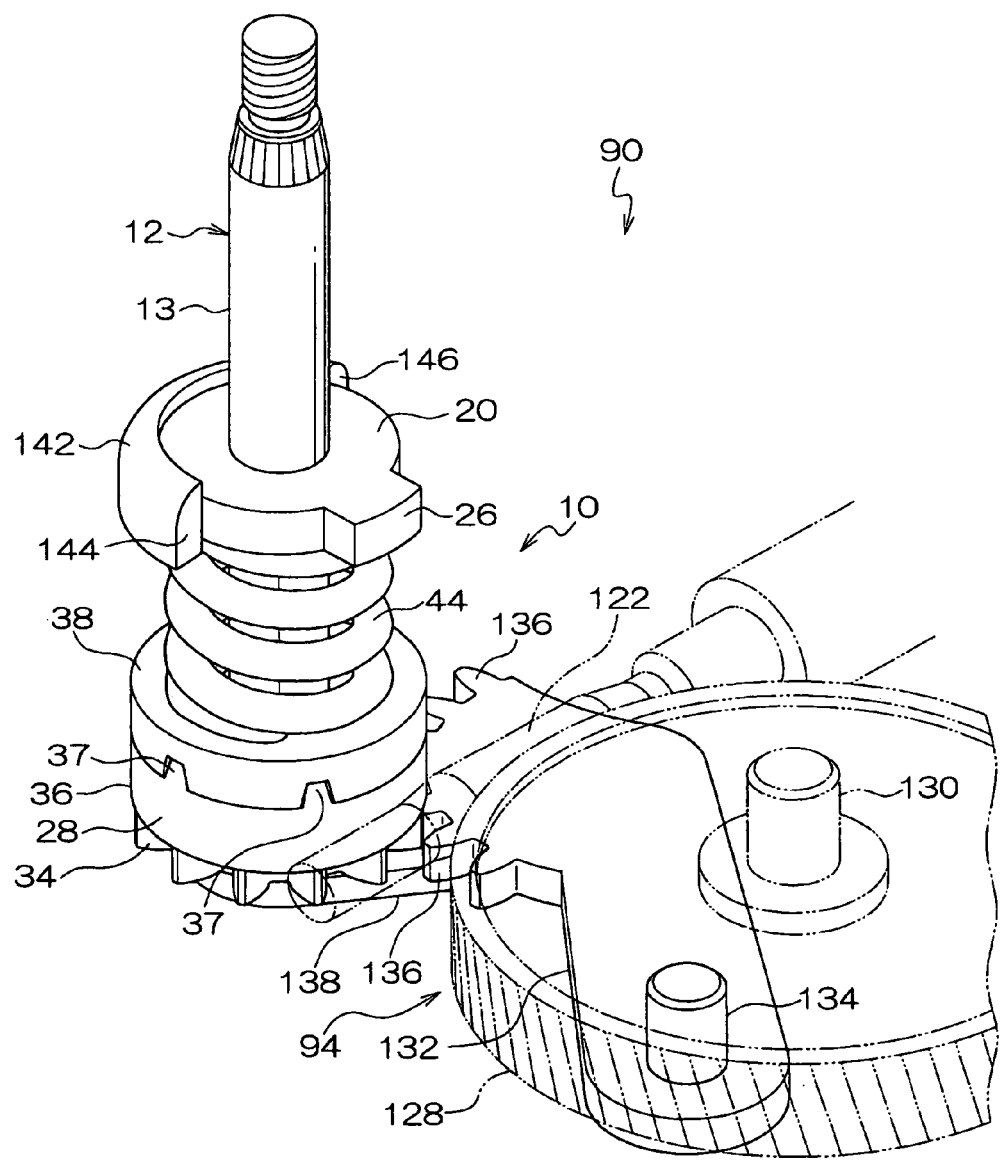
FIG. 14 is a perspective view showing a construction of peripheral parts including the swing mechanism and the clutch device, which are elements of the motor apparatus according to the embodiment of the present invention, the view showing a clutch engaged state.

In normal use condition, as shown in FIGS. 5 and 14 for example, the engaging projected portions 37 of the input disk 28 and the engaging recessed portions 42 of the clutch disk 38 are engaged with each other (fit to each other). When the clutch disk 38 is about to move in the axial direction of the output shaft 12 from the engagement state of the engaging projected portions 37 and the engaging recessed portions 42, the coil spring 44 applies a specific resistive force to maintain the engagement state. The clutch disk 38 is non-rotatable about the axis of the output shaft 12. Thus, when the input disk 28 is reciprocatingly and rotationally driven, the engaging projected portions 37 and the engaging recessed portions 42 transmits the rotational driving force from the input disk 28 to the clutch disk 38, to rotate the output shaft 12 integrally with the clutch disk 38.

Accordingly, the wiper coupled with the output shaft 12 reciprocatingly swings in accordance with the reciprocating rotation of the output shaft 12.

Figure 8:
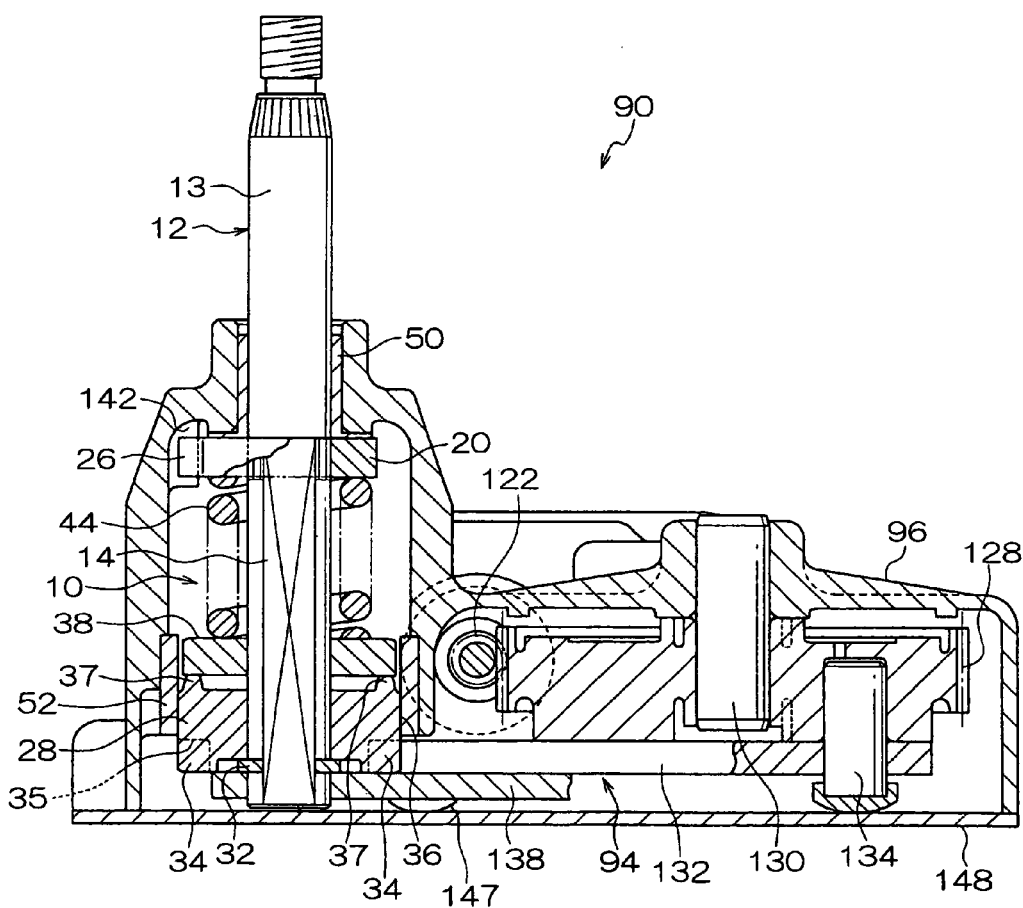
FIG. 8 is a diagram corresponding to FIG. 7, showing a clutch disengaged state of the motor apparatus according to the embodiment of the present invention.
Figure 15:
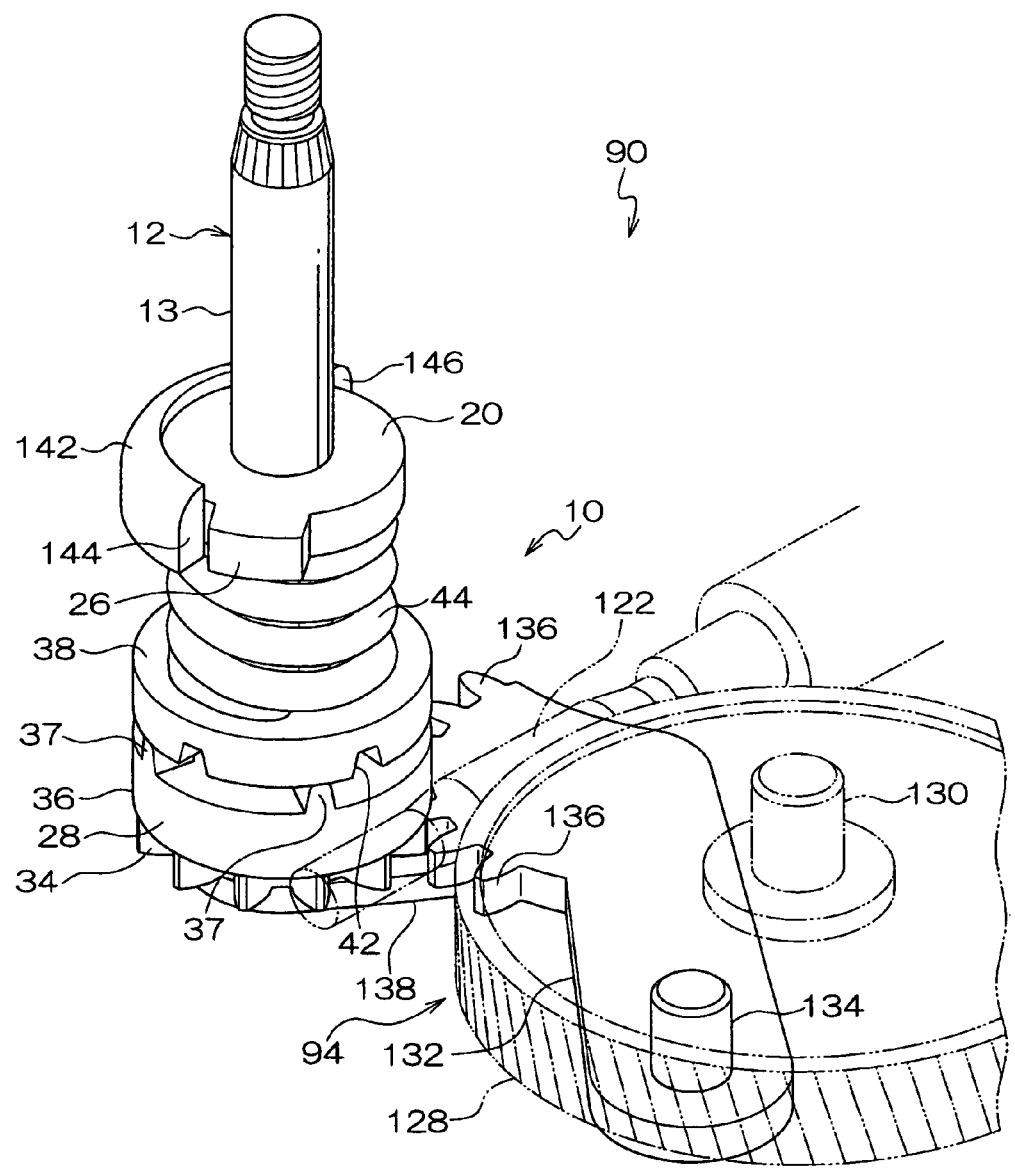
FIG. 15 is a perspective view showing the construction of peripheral parts including the swing mechanism and the clutch device, which are elements of the motor apparatus according to the embodiment of the present invention, the view showing the clutch disengaged state.

Excessively large external force (load) action from the wiper on the output shaft 12 reversely rotates or locks the output shaft 12. Then, torque acts on the clutch disk 38, which integrally rotates with the output shaft 12, in a direction to rotate the clutch disc 38 relatively to the input disk 28. Each the engaging projected portions 37 of the input disk 28 and the engaging recessed portions 42 of the clutch disk 38 has substantially so-called trapezoidal cross-sectional shape. In addition, the engaging projected portions 37 of the input disk 28 have the trailing surfaces 51, and the engaging recessed portions 42 of the clutch disk 38 have the curved control surfaces 53, so that relative torque between the input disk 28 and the clutch disk 38 generates a component force along the axial direction of the output shaft 12 (directed to the engaging base 20). Specifically, part of the relative torque between the input disk 28 and the clutch disk 38 acts as a component force to move the clutch disk 38 in the axial direction of the output shaft 12 to disengage the engaging projected portions 37 of the input disk 28 and the engaging recessed portions 42 of the clutch disk 38 from each other. When the relative torque (the component force) exceeds a specific value, the relative torque overcomes the resistive force applied by the coil spring 44. Then, as shown in FIGS. 8 and 15, the clutch disk 38 is forcibly moved in the axial direction of the output shaft 12 to release the engagement state (the engaging projected portions 37 of the input disk 28 comes out of the engaging recessed portions 42 of the clutch disk 38 to release the fit). Thus, the clutch disk 38, namely the output shaft 12 rotates idle relative to the input disk 28 (makes a relative rotation).

In the wiper motor 90, therefore, the idle rotation of the clutch device 10 prevents excessively large external force can be prevented from acting on the input disk 28 and the subsequent driving force transmission parts (the construction between the output shaft 12 and the armature 108, such as the sector gear 132, the worm wheel 128, the worm gear 122 and the motor body 92). The excessively large external force acts on the input disk 28 and the subsequent driving force transmission parts in such cases: that the motor body 92 exerts excessively large or abrupt load on the output shaft 12 when the motor body 92 is started under a condition that the wiper is frozen in its regular stop position and stuck to the surface to wipe or when snow accumulated on the wiper locks the wiper in its regular stop position; that excessively large external force exerts via the wiper on the output shaft 12 when the wiper is in operation within its operating range (regular wiping range) (for example, when snow accumulated on the roof of the vehicle falls onto the wiper along the glass surface while the wiper in wiping operation is at a position other than its lower reversing position). Thus, it is possible to protect the input disk 28 and the subsequent driving force transmission parts, to prevent them from being damaged or the motor body 92 from burnout to each component, and so on.

The strength of the input disk 28 and the subsequent components can be designed based on rotation transmitting force (clutch disengaging force) between the input disk 28 and the clutch disk 38. Therefore, it is unnecessary to allow for the action of the excessively large external force (load) in designing the input disk 28 and the subsequent components, and thus the present invention can be inexpensively constructed.

It is possible to protect driven members (the wiper, etc.) coupled with the output shaft 12 against breakage because the idle rotation of the clutch device 10 absorbs impacts.

In the clutch device 10 of the wiper motor 90, the swing mechanism 94 (worm gear 122, worm wheel 128, and sector gear 132) deceleratedly, reciprocatingly, and rotationally drives the input disk 28. Therefore, the output shaft 12 can be driven with large torque, and the wiper coupled with the output shaft 12 can be reciprocatingly driven in a favorable manner. Consequently, the wiper motor 90 is also suitable for a wiper driving motor for a vehicle that will be probably subjected to excessively large external force (load) exerted about the output shaft 12 through a wiper (in such a case that snow accumulated on the roof of a vehicle substantially perpendicularly falls onto a wiper arm along the glass surface, and excessively large external force acts on the wiper motor 90). An example of such vehicles is a truck and construction machines having a cab-over cockpit.

When the input disk 28 and the clutch disk 38 are separated from each other to interrupt the rotational transmission in the clutch device 10, that is, when the engaging projected portions 37 and the engaging recessed portions 42 are disengaged from each other, the relative displacement stroke of the input disk 28 and the clutch disk 38 gradually increases until they are completely disengaged from each other. In conjunction therewith, urging force (pressing force) of the coil spring 44 also gradually increases. As a result, surface pressure increases in the engagement portion between the engaging projected portions 37 and the engaging recessed portions 42. The operation torque also gradually increases during a period from start of action of overload to complete disengagement.

In this regard, the clutch device 10 of the wiper motor 90 in the present embodiment, the curved control surfaces 53 are curved surfaces whose curvature is gradually varied so that the component force (represented by the arrow Fb in FIG. 13) of the surface pressure (represented by the solid arrow F in FIG. 13) in the rotation transmission direction (represented by the arrow R in FIG. 13) at the contact position with the trailing surfaces 51 decreases as it moves in the direction of disengagement between the engaging projected portions 37 and the engaging recessed portions 42. Therefore, even when urging force (pressing force) of the coil spring 44 is increased, the component force Fb of the surface pressure F in the rotational transmission direction R is gradually reduced in the contact positions S. As a result, increase in the operation torque during a period from an overload action start to a disengagement completion. Thus, the disengagement load (operation torque) on the input disk 28 and the clutch disk 38 is stabilized (variation from a set value is reduced). At the same time, the curved control surfaces 53 (curved surfaces) smoothly reduce the variation in the relative displacement stroke of the engaging projected portions 37 and the engaging recessed portions 42 (variation in urging force). The curved control surfaces are so formed that the variation in the relative displacement stroke, that is, the variation in urging force (pressing force) is gradually varied. Therefore, wear is reduced and durability is enhanced.

In the clutch device 10 of the wiper motor 90, the engaging surfaces are formed in such a shape that the engaging projected portions 37 and the engaging recessed portions 42 are engaged with each other in line contact in the circumferential direction of the output shaft 12. Therefore, the engaging projected portions 37 and the engaging recessed portions 42 are separated from each other in the axial direction, following the curved control surfaces 53. For this reason, the clutch operation characteristics of the input disk 28 and the clutch disk 38 can be set by adjusting the shape of the curves of the curved control surfaces 53. As mentioned above, further, the shape of the curved control surfaces 53 is so set that the angle formed by tangential lines S1 to S3 in a position of contact with the trailing surfaces 51 and a plane perpendicular to the axis of the output shaft 12 is gradually reduced as it moves in the direction of disengagement of the engaging projected portions 37 and the engaging recessed portions 42. Therefore, a variation in the relative displacement stroke of the engaging projected portions 37 and the engaging recessed portions 42, that is, a variation in urging force (pressing force) is gradually reduced, and wear and change in shape are reduced. As a result, change in clutch operation characteristics with time can be reduced.

Figure 18:
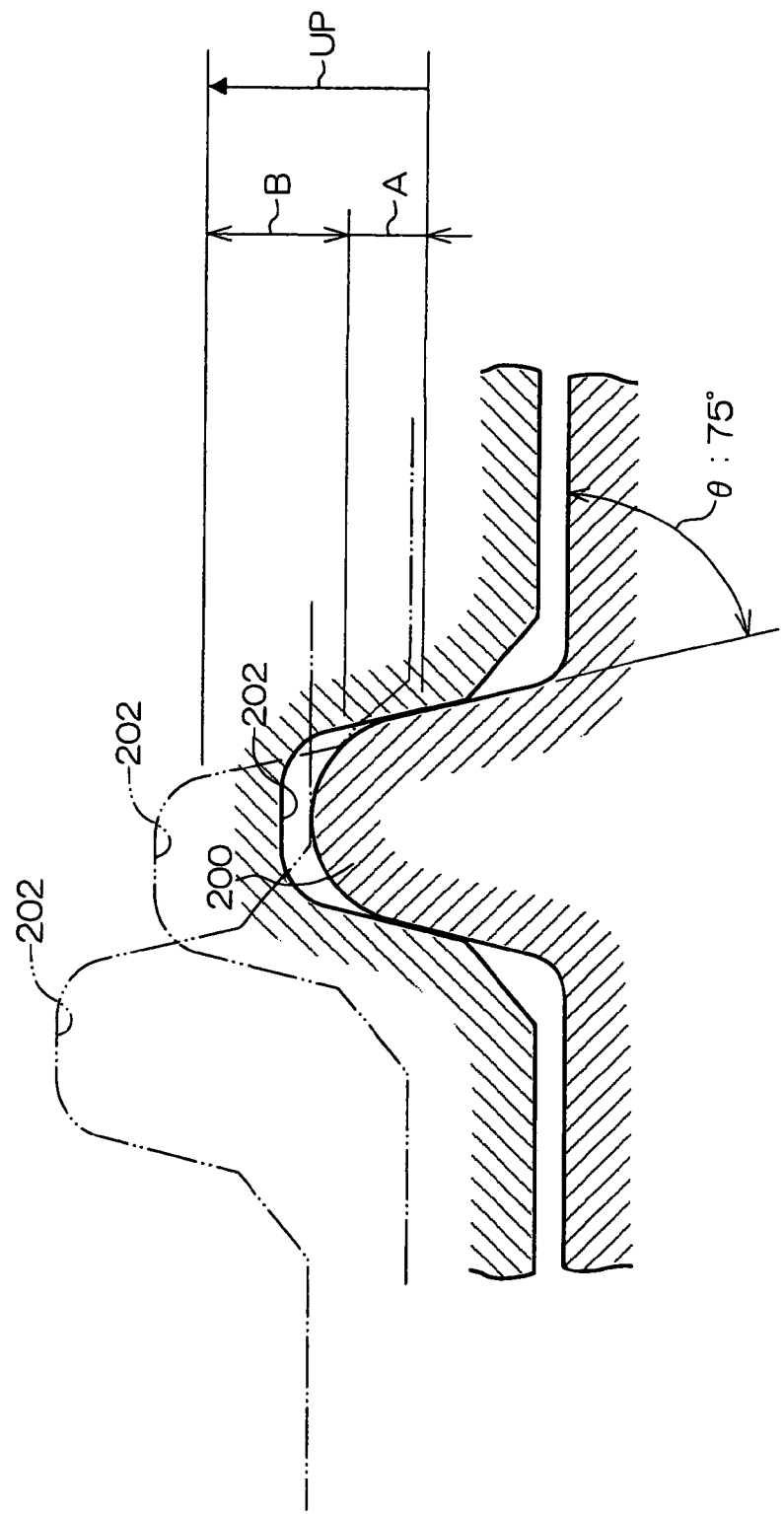
FIG. 18 is a cross-sectional view showing a construction of an engaging projected portion and an engaging recessed portion of a clutch device according to a comparative example.

FIG. 18 presents a comparative example to explain the effect of the clutch device 10 of the wiper motor 90 in the present embodiment. The figure shows the construction of an engaging projected portion 200 and an engaging recessed portion 202. The figure is a sectional view corresponding to FIG. 13.

The engaging projected portions 200 and the engaging recessed portions 202 are so constructed that they are in surface contact with each other. (Also, in the sectional view, their contact faces are linearly formed.) Their contact faces are so formed that they are inclined by 75 degrees from the axis of the output shaft 12.

Figure 19:
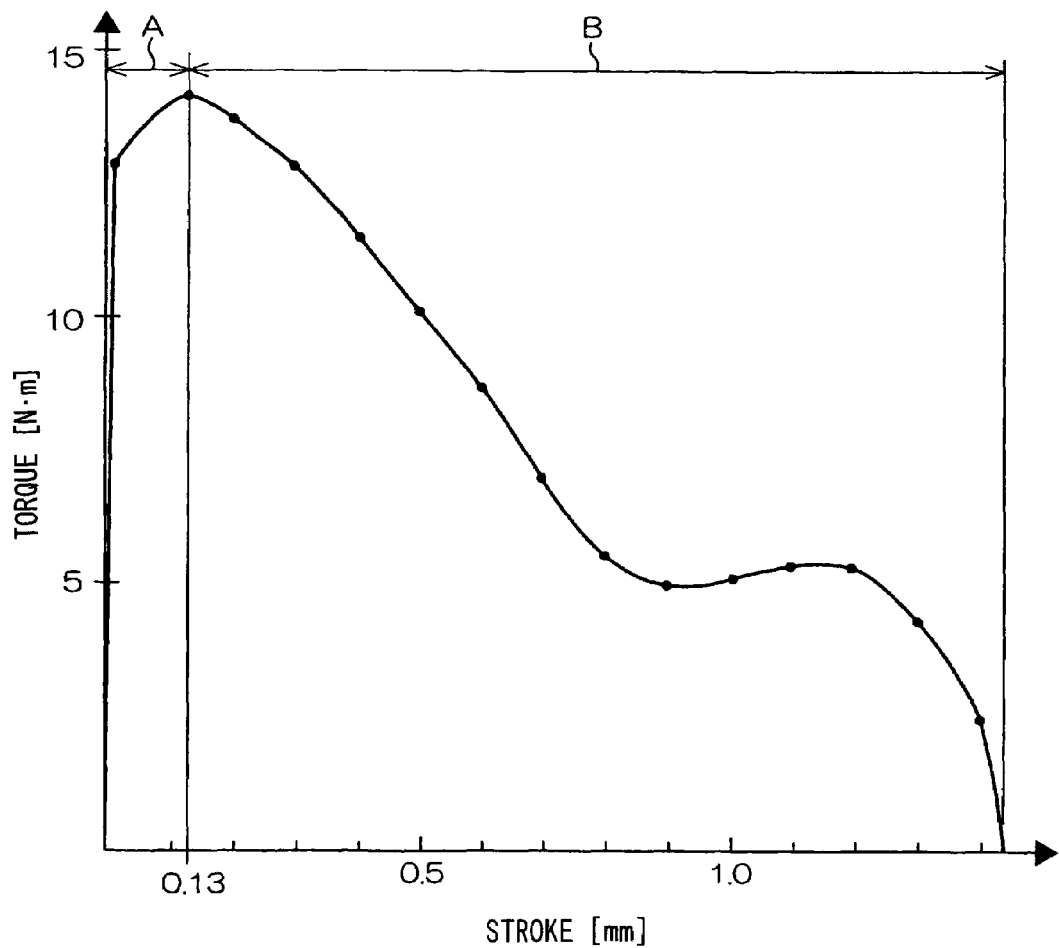
FIG. 19 is a chart showing an operation torque characteristics of the clutch device according to the comparative example.

FIG. 19 is a chart illustrating the operation torque characteristics of the engaging projected portions 200 and the engaging recessed portions 202. Specifically, the chart shows change in the value of operation torque versus displacement stroke during a period from start of action of overload to complete disengagement. The torque was actually measured in a position 23 cm from the axis of the output shaft 12 with a wiper arm with a blade installed on the output shaft 12.

As is apparent from FIG. 19, when the engaging projected portions 200 and the engaging recessed portions 202 are disengaged from each other, the relative displacement stroke of them is gradually increased. In conjunction therewith, urging force (pressing force) of the coil spring 44 is also increased. Therefore, surface pressure is increased in the areas of engagement between the engaging projected portions 200 and the engaging recessed portions 202, and frictional force is increased. Especially in stroke range A, the operation torque is also gradually increased (the operation torque greatly fluctuates). That is, especially in the stroke range A, the disengagement load (operation torque) is not stable (variation from a set value is great). For this reason, the surface pressure is also increased in the areas of engagement between the engaging projected portions 200 and the engaging recessed portions 202. Therefore, wear is increased, and there is apprehension that the durability will be degraded.

Meanwhile, the clutch device 10 of the wiper motor 90 in the present embodiment is constructed as mentioned above. That is, the curved control surfaces 53 are curved surfaces whose curvature is gradually varied so that the following is implemented: as they move in the direction of disengagement of the engaging projected portions 37 and the engaging recessed portions 42, a component force Fb of surface pressure F in the rotational transmission direction is reduced in the positions of contact with the trailing surfaces 51. Therefore, increase in operation torque during a period from start of action of overload to complete disengagement is suppressed. As a result, flat torque characteristics can be obtained.

Figure 16:
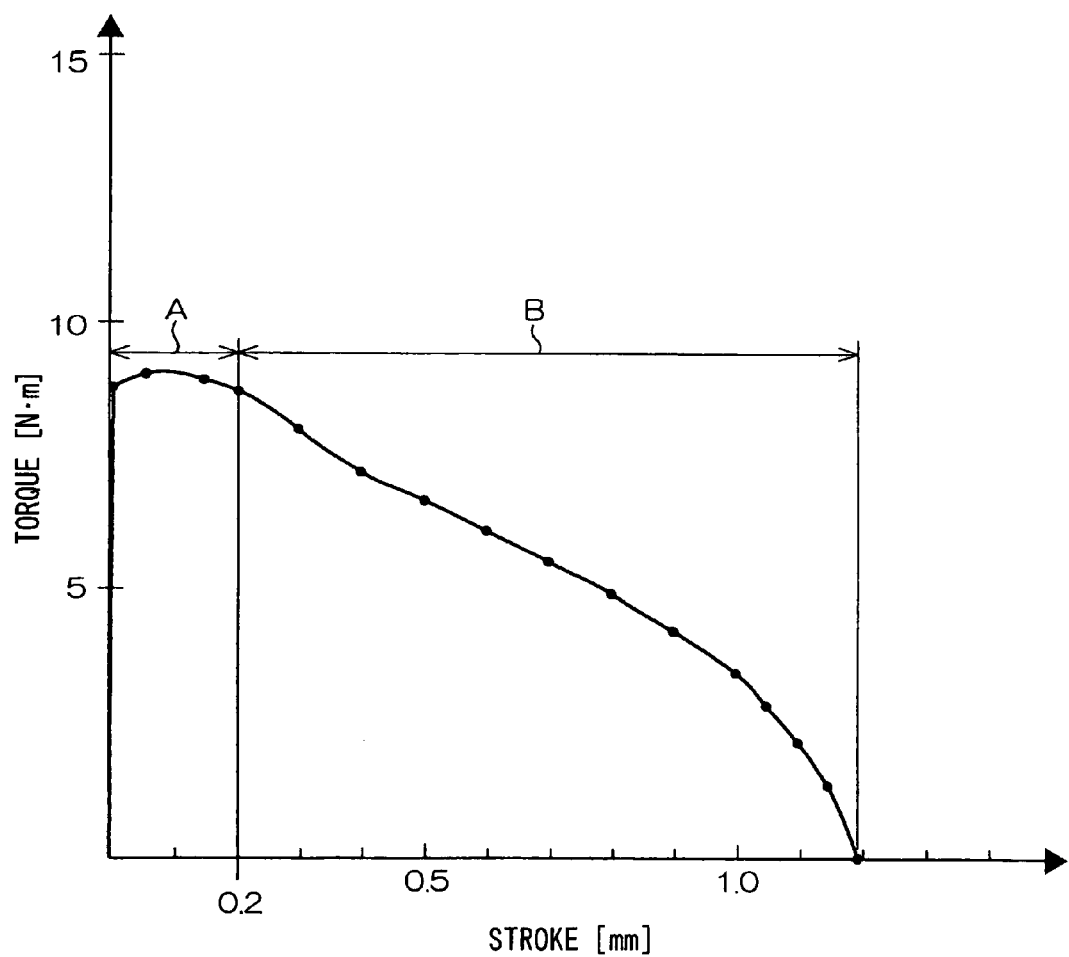
FIG. 16 is a chart showing an operation torque characteristics of the clutch device of the motor apparatus according to the embodiment of the present invention.

Just as the FIG. 19, FIG. 16 is a chart illustrating the operation torque characteristics of the engaging projected portions 37 and the engaging recessed portions 42. Specifically, the chart shows change in the value of operation torque versus displacement stroke during a period from start of action of overload to complete disengagement. Measurement was conducted under the same conditions as for the comparative example.

As is apparent from FIG. 16, when the engaging projected portions 37 and the engaging recessed portions 42 are disengaged from each other, the relative displacement stroke of them is gradually increased. In conjunction therewith, urging force (pressing force) of the coil spring 44 is also gradually increased. However, the curved control surfaces 53 are curved surfaces whose curvature is gradually varied; therefore, the following advantage is brought: even when urging force (pressing force) of the coil spring 44 is increased, a component force Fb of surface pressure F in the rotational transmission direction R is gradually reduced in contact potions S. As a result, increase in operation torque is suppressed (the operation torque hardly varies) during a period from start of action of overload to complete disengagement. Especially in stroke range A, the disengagement load (operation torque) is stable (variation from a set value is little). A variation in the relative displacement stroke of the engaging projected portions 37 and the engaging recessed portions 42 is smoothly reduced. Therefore, wear is reduced, and durability is enhanced.

In the example cited in relation to The present embodiment, the trailing surfaces 51 of the engaging projected portions 37 are so formed that they are inclined by "54.4°" from the axis of the clutch disk 38 (output shaft 12). When this inclination angle θ is increased, variation in operation torque is increased. To avoid this, it is preferable that the inclination angle θ should be set to as small a value as possible within the range of operable angle required for clutch operation torque.

In the clutch device 10 of the wiper motor 90 in The present embodiment, the peak value of torque about the output shaft 12 is set within the range of 7 N·m to 20 N·m during a period before the engaging projected portions 37 and the engaging recessed portions 42 are disengaged from each other.

When the torque about the output shaft 12 is lower than 7 N·m during a period before the engaging projected portions 37 and the engaging recessed portions 42 are disengaged from each other, the clutch can be easily disengaged by normal wiping load on the wiper blade. Such normal wiping load includes a windshield glass surface in so-called semidry state. When the torque is higher than 20 N·m, the strength of internal components, such as swing mechanism, must be enhanced. This hinders member cost reduction.

In the clutch device 10 of the wiper motor 90 in the present embodiment, the torque is set within a favorable range, and the above-mentioned problem does not arise.

In the wiper motor 90, the holding lever 138, which is provided on the one side in the thickness direction of the sector gear 132, couples the swing center shaft 140 of the sector gear 132 and the output shaft 12 with each other. Thus, the center distance (the pitch between axes) between the swing center shaft 140 of the sector gear 132 and the output shaft 12 (the pitch between their axes) remains constant. In addition, the cog portion 136 of the sector gear 132 is sandwiched in its thickness direction between the holding lever 138, which is positioned on the one side in the thickness direction, and the coupling wall 35 of the input disk 28, which is positioned on the other side (the clutch disk 38 side) in the thickness direction. Thus, the engagement margin of the gear cogs 136 and the cog portion 34 is maintained in the thickness direction of the sector gear 132 (the disengagement of the sector gear in the thickness direction is prevented from occurring) without the holding member (the holding lever) on both sides of the sector gear 132 in the thickness direction. Thus, desirable engagement state can be maintained between the sector gear 132 and the input disk 28.

In the wiper motor 90, the engaging base 20 (the large diameter portion) is fixed on and integrated with the turn-stop portion 16 of the output shaft 12 having a plurality of ridges. Especially, the engaging base 20 is firmly fixed on the turn-stop portion 16 in the rotational direction about the axis of the output shaft 12. At the same time, the drop-prevention portion 18 of the output shaft 12 prevents the input disk 28 from coming off. In addition, the relative rotation restriction portion 14 of the output shaft 12 (specifically, the portion between the engaging base 20 and the input disk 28) supports the clutch disk 38 to be slidable thereon in its axial direction. That is, the respective parts are assembled relative to the output shaft 12 to dispose the clutch disk 38 and the coil spring 44 in a fixed space (in a set dimension) between the engaging base 20 and the input disk 28. Thus, the force required for the axial movement of the clutch disk 38 (the clutch disengaging force) can be simply set as described above.

The wiper motor 90 utilizes the elastic member as the coil spring 44, so that the spring characteristics are stable. Specifically, when a rubber member, for example, is used for the elastic member, grease or the like applied to the clutch device 10 can stick to and deteriorate the rubber member. The coil spring 44 is free from the possibility of deterioration due to sticking grease or the like; therefore, its spring characteristics are stable.

Further, the coil spring 44 is wound around the output shaft 12 and disposed between the engaging base 20, at which the diameter is enlarged in the radial direction of the output shaft 12 and which is unmovable in the axial direction, and the clutch disk 38. Thus, the coil spring 44 can stably press the clutch disk 38 against the input disk 28 and can apply stable resistive force. That is, the clutch disk 38 uniformly distributes the elastic force of the coil spring 44 in the area of engagement between the input disk 28 and the clutch disk 38. Therefore, the engagement between the input disk 28 and the clutch disk 38 becomes stable. At the same time, also the value of rotation transmitting force (the clutch disengaging force) between the input disk 28 and the clutch disk 38 (between the engaging projected portions 37 and the engaging recessed portions 42) becomes stable. Accordingly, the value of the clutch disengaging force can be more desirably set, to protect the components of the wiper motor 90 more securely.

In the wiper motor 90, the outer circumference of the input disk 28, which is supported on the output shaft 12, serves as the circumferential surface 36 at the opposite side from the gear cogs 34 with respect to the coupling wall 25. The bearing member 52, which is fixed in the housing 96, rotatably holds (supports) the circumferential surface 36. That is, the bearing member 52 of the housing 96 directly supports the input disk 28, to which the sector gear 132 inputs the load. Thus, the supporting rigidity of the input disk 28 becomes large. This large supporting rigidity stabilizes the engagement between the input disk 28 and the sector gear 132, too. In addition, the housing 96 (the bearing member 52) supports the base end portion of the output shaft 12 via the input disk 28. This construction obviates a particular space for supporting the base end portion of the output shaft 12 in the housing 96 (the installation space of the input disk 28 also serves as the supporting space for the base end portion of the output shaft 12), and secures a long distance between the bearing member 52, which supports the base end portion of the output shaft 12, and the bearing member 50, which supports the leading end portion of the output shaft 12 in the axial direction of the output shaft 12. Accordingly, it is possible to increase the supporting rigidity of the output shaft 12 against the housing 96.

In the wiper motor 90, both the input disk 28 and the clutch disk 38 are made of sintered metal, which is compacted powder alloy. Thus, these members can be manufactured with high accuracy by powder metallurgy process, and further the material yield of these members is high. The input disk 28 and the clutch disk 38 are made of sintered metal, which is impregnated with lubricating oil. Accordingly, the engaging portion between the input disk 28 and the clutch disk 38 (the engaging projected portions 37, the engaging recessed portions 42, etc.) can be provided with self-lubricating property. Further, the gear cogs 34 of the input disk 28, which are engaged with the cog portion 136 of the sector gear 132, and the bearing member 52, which rotatably supports the input disk 28, are provided with self-lubricating property, too.

In the wiper motor 90, the engaging projected portions 37 of the input disk 28 and the engaging recessed portions 42 of the clutch disk 38 are formed so that they are not at equal intervals in the circumferential direction of the input disk 28 and in the circumferential direction of the clutch disk 38, respectively (so that the intervals between the engaging projected portions 37 differ from one another and the intervals between the engaging recessed portions 42 differ from one another in the circumferential directions). Also in a clutch disengaged state, in which the engaging projected portions 37 are out of the engaging recessed portions 42, the clutch disk 38 is mated with at least three engaging projected portions 37 of the input disk 28 (the clutch disk 38 is supported at three points). Thus, the engagement state between the clutch disk 38 and the input disk 28 is stabilized even in the clutch disengaged state.

The input disk 28 and the clutch disk 38 (the output shaft 12 and the wiper) can be engaged with each other only when they are at a specific relative position in the circumferential direction. Thus, in the clutch disengaged state, in which the engaging projected portions 37 are out of the engaging recessed portions 42 (in which the input disk 28 and the clutch disk 38 are at any relative position other than the specific relative position), the input disk 28 and the clutch disk 38 are engaged with each other only at the specific position by a driver's manual swinging operation. Accordingly, the clutch disk 38 (the output shaft 12 and the wiper) can easily and swiftly returns to its original set state (initial set state) relative to the input disk 28. Further, the wiper apparatus can be actuated again without breakage.

In the above-described clutch device 10, when the engaging projected portions 37 and the engaging recessed portions 42 are engaged with each other to transmit rotational force therebetween, or when the engaging projected portions 37 and the engaging recessed portions 42 are about to be disengaged with each other, the rotational force acts on the contact portions between the engaging projected portions 37 and the engaging recessed portions 42 (between the trailing surfaces 51 and curved control surfaces 53). At this time, if both edges of the engaging projected portions 37 in the circumferential direction or both edges of the engaging recessed portions 42 in the circumferential direction are in parallel to each other, the surface pressure is larger at a radially inner portion than at a radially outer portion of the edges, and this causes uneven wear.

In the clutch device 10 in the present embodiment, the engaging projected portions 37 of the input disk 28 and the engaging recessed portions 42 of the clutch disk 38 are formed as shown in FIG. 12. That is, their edges (the side wall portions) in the circumferential direction are formed to agree with radial lines intersecting with the axis of each member (the axis of the output shaft 12) (to open radially outward in the fan-like fashion). Thus, in the contact portions between the engaging projected portions 37 and the engaging recessed portions 42, the surface pressure is uniform from the radially inner portion to the radially outer portion (the Hertz contact surface pressure due to sliding is reduced). Therefore, the contact portions are prevented from wearing unevenly, and wear resistance is enhanced.

Further, in the wiper motor 90, in transmitting the rotational driving force from the input disk 28 to the output shaft 12 of the clutch device 10 as described above, the resistive force of the coil spring 44 acts against the axial movement of the clutch disk 38 from the above-mentioned engagement state, only to maintain the engagement between the engaging projected portions 37 of the input disk 28 and the engaging recessed portions 42 of the clutch disk 38 in the normal use condition (in the rotational state). At this time, the resistive force is not wasted by sliding friction. Thus, degradation in the efficiency of rotation transmission efficiency can be prevented from decreasing. The rotational driving force is transmitted without sliding the members over each other, so that abnormal noise is prevented from occurring in accordance with the slides of the members.

As described above, the resistive force of the coil spring 44 acts against the axial movement of the clutch disk 38 from the engagement state, to maintain the engagement between the engaging projected portions 37 and the engaging recessed portions 42. The resistive force is received by the engaging base 20, which is fixed on the output shaft 12, and the input disk 28, which is supported on the output shaft 12 on the one side in the axial direction not to from coming off the output shaft 12. That is, the force to maintain the engagement is received by two components (the engaging base 20 and the input disk 28) fixed on the output shaft 12. In other words, the clutch device 10 of the wiper motor 90 has such a construction that it is completed as a subassembly of the output shaft 12, not such a construction that it is completed together with other components such as the housing 96. Thus, the clutch device 10 can be handled as one component, that is, as "output shaft 12 subassembly".

As described above, the clutch device 10 of the wiper motor 90 has such a construction the engaging projected portions 37 of the input disk 28 get into the engaging recessed portions 42 of the clutch disk 38 to transmit the from the input disk 28 to the clutch disk 38. Thus, it is possible to transmit the driving force more securely from the input disk 28 to the clutch disk 38, and to prevent the respective parts and the driving force transmission parts associated with the input disk 28 from being damaged. Accordingly, the excessively large external force (load) action need not be taken into account in designing the strength of the respective parts. Further, the fluctuation in the set load for the clutch operation remains stable for a long term.

Excessively large external force (load) may be exerted on the output shaft 12 through the wiper, and the clutch disk 38 or the output shaft 12 may idly rotate relative to the input disk 28. The input disk 28 and the clutch disk 38 (the engaging projected portions 37 and the engaging recessed portions 42) are made of sintered metal material so that the one having the curved control surfaces 53 (specifically, the clutch disk 38 having the engaging recessed portions 42) is higher in hardness than the other having the trailing surfaces 51 (specifically, the input disk 28 having the engaging projected portions 37). Thus, when the engaging projected portions 37 and the engaging recessed portions 42 (the trailing surfaces 51 and the curved control surfaces 53) are repeatedly engaged and disengaged with each other, the wear in the one having the curved control surfaces 53 is smaller than the wear in the other having the trailing surfaces 51 (the wear develops slower in the one having the curved control surfaces 53 than in the other having the trailing surfaces 51). With respect to the engaging projected portions 37 and the engaging recessed portions 42 in the present embodiment, therefore, the shapes of the engaging recessed portions 42 having the curved control surfaces 53 change small from their initial ones. That is, the curved surface shapes of the curved control surfaces 53, which is large in hardness, is maintained, so that they are kept in the above-mentioned line contact engagement with the trailing surfaces 51 of the engaging projected portions 37. The curved surface shapes of the curved control surfaces 53 is maintained even when worn as described above, so that the trailing surface 51 of the engaging projected portions 37 in line contact with the curved control surfaces 53 are controlled to follow the shapes of the curved control surfaces 53, which are worn small. Thus, the load, which is necessary for the above-mentioned component force to release the engagement state between the engaging projected portions 37 and the engaging recessed portions 42, become stable. Accordingly, the fluctuation in the set load for the clutch operation (the clutch operation torque) remains stable for a long term.

With respect to the trailing surfaces 51 of the engaging projected portions 37, the predetermined inclination angle θ is set as small as possible within the range of operable angle required for clutch operation torque, so that the variation in clutch operation torque from a set value is stabilized for a long term (so that dispersion in clutch operation torque decreases).

The curved control surfaces 53 are formed on the left and right sides of the trapezoidal engaging recessed portions 42 (on both sides in the circumferential direction of rotation), so that the above-described actions and effects of the curved control surfaces 53 are brought in both of the normal and reverse rotational conditions of the output shaft 12.

As described above, the wiper motor 90 (clutch device 10) according to the present embodiment brings an effect to stabilize the disengagement load (operation torque) of the input disk 28 and the clutch disk 38 (to reduce a variation from a set value), so as to reduce wear and to improve the durability. The wiper motor 90 stabilizes the disengagement load of the input disk 28 and the clutch disk 38 (reduces a variation from a set value) even when repeated engagements and disengagement wears them.

With respect to the input disk 28 and the clutch disk 38 constituting the clutch device 10, the above-described embodiment has a construction in which the input disk 28 is provided with the engaging projected portions 37 and the clutch disk 38 is provided with the engaging recessed portions 42. Alternatively, the present invention may have a construction in which the input disk 28 is provided with the engaging recessed portions 42 and the clutch disk 38 is provided with the engaging projected portions 37.

This description of the invention is merely exemplary in nature and, thus, variations that do not depart from the gist of the invention are intended to be within the scope of the invention. Such variations are not to be regarded as a departure from the spirit and scope of the invention.

What is claimed is:

1. A clutch device comprising:
   an output shaft rotatably supported in a housing;
   an input disk that is supported on the output shaft rotatably about an axis of the output shaft to be rotated by an input of a rotational driving force;
   a clutch disk that is supported on the output shaft non-rotatably about the axis and movably in an axial direction of the output shaft to face the input disk in the axial direction to come into an engagement with the input disk in the axial direction;
   an elastic member that exerts resistive force on the clutch disk when the clutch disk is about to come out of the engagement with the input disk, wherein:
      one of the input disk and the clutch disk has a trailing surface inclined by a predetermined angle from the axis, and the other of the input disk and the clutch disk has a curved control surface to face the trailing surface in a circumferential direction of the output shaft to come in a line contact with the trailing surface;
      the curved control surface has a gradually varied curvature to decrease a component force of a surface pressure at a contact line with the trailing surface in a transmission direction of the rotational driving force as the input disk and the clutch disk rotate against each other to disengage them from each other;

the input disk has an outer circumferential surface that is circularly curved to be coaxial with the output shaft; and the outer circumferential surface of the input disk is rotatably supported by the housing.

2. The clutch device according to claim 1, wherein one of the input disk and the clutch disk is provided with an engaging projected portion that protrudes in the axial direction of the output shaft; and the other of the input disk and the clutch disk is provided with an engaging recessed portion that is depressed to be engaged with the engaging projected portion.

3. The clutch device according to claim 2, wherein the curved control surface has a gradually varied curvature to decrease an angle formed by a tangential line at a contact line with the trailing surface and a plane perpendicular to the axis in accordance with a shift of the contact line when the input disk and the clutch disk rotate against each other to disengage them from each other.

4. The clutch device according to claim 3, wherein the curved control surface has a shape that stabilizes disengagement load of the clutch disk from the input disk while a relative displacement stroke of the clutch disk with respect to the input disk is in a predetermined range since the clutch disk is disengaged from the input disk.

5. The clutch device according to claim 2, wherein a plurality of the engaging projected portions and a plurality of the engaging recessed portions are respectively disposed at intervals in the circumferential direction of the output shaft on surfaces of the input disk and the clutch disk that face with each other around the axis; and edges of each the engaging projected portions and the engaging recessed portions in the circumferential direction matches with any radial line intersecting with the axis.

6. The clutch device according to claim 1, wherein at least one of the input disk and the clutch disk is made of sintered metal material.

7. The clutch device according to claim 6, wherein the sintered metal material is impregnated with lubricating oil.

8. The clutch device according to claim 1, wherein the input disk has:

one axial side of the outer circumferential surface, which is opposite from the clutch disk in the axial direction, has gear cogs into which the rotational driving force is inputted.

9. The clutch device according to claim 1, wherein:

the output shaft is provided with a large diameter portion at which a diameter is increased and that is immovable in the axial direction; and the elastic member is a coil spring that is wound around the output shaft to be compressible in the axial direction and interposed between the clutch disk and the large diameter portion.

10. A motor apparatus comprising:

the clutch device according to claim 1;

a motor body that generates the rotational driving force to rotate the input disk of the clutch device; and a speed reduction mechanism that deceleratingly transmits the rotational driving force to the input disk.

11. A motor apparatus comprising:

the clutch device according to claim 1;

a motor body that generates the rotational driving force to rotate the input disk of the clutch device; and a motion transformation mechanism having:

a worm gear that is provided on a rotating shaft of the motor body;

a worm wheel that is rotatable about a wheel shaft perpendicular to the rotating shaft and engaged with and rotationally driven by the worm gear; and a swing member one end of which is coupled with the worm wheel at a position eccentric to the wheel shaft and the other end of which is engaged with the input disk to transform a rotation of the worm wheel into a reciprocating rotation of the input disk, wherein the output shaft of the clutch device is coupled with a wiper to drive the wiper reciprocatingly.

12. The clutch device according to claim 1, wherein the other of the input disk and the clutch disk having the curved control surface is higher in hardness than the one having the trailing surface.

13. The clutch device according to claim 1, wherein a diameter of the clutch disk is shorter than a diameter of the outer circumferential surface of the input disk.

\* \* \* \* \*